US011887220B2

(12) United States Patent
Byoun et al.

(10) Patent No.: US 11,887,220 B2
(45) Date of Patent: Jan. 30, 2024

(54) GHOST IMAGE MITIGATION FOR HEADS-UP DISPLAY

(71) Applicant: HARMAN INTERNATIONAL INDUSTRIES, INCORPORATED, Stamford, CT (US)

(72) Inventors: Daehyoun Byoun, Seoul (KR); Sung Ki Jin, Suwon (KR); Joong Hun Kwon, Seoul (KR); Hyeongchan Seo, GwangMyeong (KR); Junghoon Seo, Seoul (KR)

(73) Assignee: Harman International Industries, Incorporated, Stamford, CT (US)

( * ) Notice: Subject to any disclaimer, the term of this patent is extended or adjusted under 35 U.S.C. 154(b) by 0 days.

(21) Appl. No.: 17/839,360

(22) Filed: Jun. 13, 2022

(65) Prior Publication Data

US 2023/0401760 A1    Dec. 14, 2023

(51) Int. Cl.
| | | |
|---|---|---|
| *G06T 11/00* | (2006.01) | |
| *G02B 27/01* | (2006.01) | |
| *G09G 3/00* | (2006.01) | |
| *G06T 11/60* | (2006.01) | |
| *G06T 11/20* | (2006.01) | |
| *B60K 35/00* | (2006.01) | |

(52) U.S. Cl.
CPC ............ *G06T 11/001* (2013.01); *B60K 35/00* (2013.01); *G02B 27/0101* (2013.01); *G06T 11/203* (2013.01); *G06T 11/60* (2013.01); *G09G 3/002* (2013.01); *B60K 2370/1529* (2019.05); *B60K 2370/20* (2019.05); *G02B 2027/012* (2013.01); *G02B 2027/014* (2013.01); *G09G 2380/10* (2013.01)

(58) Field of Classification Search
CPC ...... G06T 11/001; G06T 11/203; G06T 11/60; B60K 35/00; B60K 2370/1529; B60K 2370/20; G02B 27/0101; G02B 2027/012; G02B 2027/014; G09G 3/002; G09G 2380/10

See application file for complete search history.

(56) References Cited

U.S. PATENT DOCUMENTS

| 10,754,152 B2 | 8/2020 | Arndt et al. | |
|---|---|---|---|
| 2018/0277027 A1* | 9/2018 | Misawa | G06F 3/013 |
| 2020/0285051 A1 | 9/2020 | Ma | |
| 2022/0044455 A1* | 2/2022 | Kanazawa | G06T 11/203 |
| 2023/0137121 A1* | 5/2023 | Kojima | G09G 3/001 |
| | | | 345/589 |

FOREIGN PATENT DOCUMENTS

| WO | 2020/141076 A1 | 7/2020 |
|---|---|---|
| WO | 2022/084676 A1 | 4/2022 |

* cited by examiner

*Primary Examiner* — Christopher E Leiby
(74) *Attorney, Agent, or Firm* — Artegis Law Group, LLP

(57) ABSTRACT

Embodiments of the present disclosure set forth techniques for mitigating ghost images in a heads-up display. A computer-implemented method includes generating content for display on a heads-up display system, inserting into the content a version of a display element, wherein the version of the display element comprises one or more visual characteristics configured to reduce a perceivability of a ghost image of the display element, and causing the content, including the version of the display element, to be displayed by the heads-up display system.

19 Claims, 15 Drawing Sheets

GHOST IMAGE MITIGATION FOR HEADS-UP DISPLAY

BACKGROUND

Field of the Various Embodiments

The various embodiments relate generally to heads-up displays, and more specifically, to ghost image mitigation for a heads-up display.

Description of the Related Art

A vehicle can be equipped with a heads-up display system for presenting information to an occupant (e.g., a driver, an operator, a passenger) of the vehicle. The heads-up display system presents information in a way that allows the occupant to continue looking forward, toward the environment in front of the vehicle, without needing to look down toward an instrument panel, dashboard, or the like. Vehicles of different types can implement a heads-up display to facilitate maintained attention by a vehicle operator on the environment in front of the vehicle.

In a heads-up display system, content is typically projected onto a transparent object (e.g., a windshield of the vehicle, a transparent display positioned between the occupant and the windshield), and the content reflects from the transparent object toward the occupant. A drawback of heads-up display systems is that the system can present a ghost image of content projected by the system, as well as the intended virtual image of the projected content. The ghost image is a consequence of the projected content reflecting from multiple surfaces of the transparent object toward the occupant, resulting in the intended virtual image and the ghost image of the content arriving at the eyes of the user at different angles relative to the transparent object. The ghost image can be a distraction for the occupant trying to view the projected content and/or makes the head-up display less effective at conveying information to the occupant.

An approach to addressing the ghost image issue is to introduce a wedge-shaped interlayer between layers of the transparent object. For example, the transparent object can include an interlayer film of varying thickness like a wedge (as opposed to substantially uniform thickness) sandwiched between two pieces of glass. The wedge-shaped piece of material alters the angles at which the intended virtual image and the ghost image arrive at the eye of the occupant, compared to a transparent object with no interlayer or an interlayer of substantially uniform thickness, so that the ghost image is less perceivable by the occupant. A drawback of this approach is that manufacturing a windshield with a wedge shaped interlayer is more expensive compared to manufacturing the same windshield with an interlayer of substantially uniform thickness. Another drawback is that the wedge-shaped interlayer would have to be customized for each vehicle model. These drawbacks make this approach a less than desirable response to the ghost image issue.

What is needed is an effective way to mitigate the ghost images in a heads-up display system.

SUMMARY

One embodiment sets forth a computer-implemented method comprising generating content for display on a heads-up display system, inserting into the content a version of a display element, where the version of the display element comprises one or more visual characteristics configured to reduce a perceivability of a ghost image of the display element, and causing the content, including the version of the display element, to be displayed by the heads-up display system.

One embodiment sets forth a system comprising a transparent object and a projection device configured to project content onto the transparent object, where the content comprises one or more display elements, each having one or more visual characteristics configured to reduce perceivability of a ghost image created when the content is projected onto the transparent object.

Further embodiments provide, among other things, one or more non-transitory computer-readable media and systems configured to implement the method set forth above.

At least one technical advantage of the disclosed approaches relative to the prior art is that, with the disclosed techniques, the perceivability of ghost images in a heads-up display system are reduced. Accordingly, content presented by the heads-up display system can be more easily seen by a vehicle occupant. Another advantage is that the ghost images are reduced without resorting to a wedge-shaped interlayer in a transparent object used to reflect an image to a user, which reduces the manufacturing and/or implementation expense and complexity of heads-up display systems. These technical advantages provide one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

Figure 1:
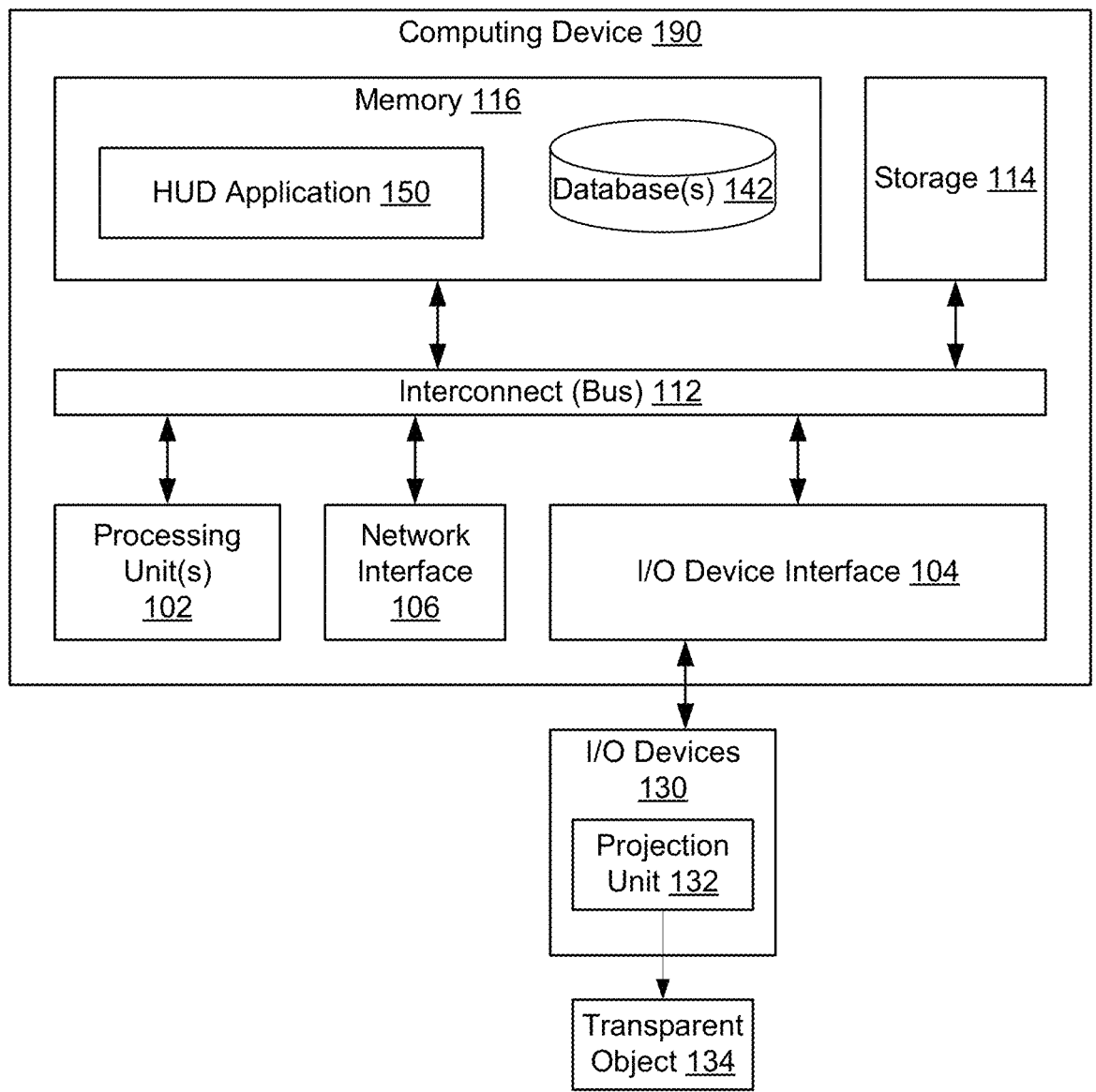
FIG. 1 is a block diagram of a heads-up display system, according to various embodiments.

FIG. 1 illustrates a block diagram of a heads-up display ("HUD") system 100 configured to implement one or more aspects of the various embodiments. As shown, HUD system 100 includes, without limitation, computing device 190, input/output (I/O) device(s) 130, and a transparent object 134. Computing device 190 includes, without limitation, one or more processing units 102, I/O device interface 104, network interface 106, interconnect (bus) 112, storage 114, and memory 116. Memory 116 stores database(s) 142 and HUD application 150. Processing unit(s) 102, I/O device interface 104, network interface 106, storage 114, and memory 116 can be communicatively coupled to each other via interconnect 112. In various embodiments, HUD system 100 can display content to a user (e.g., a vehicle driver or operator) by projecting images of text, graphics, icons, etc. corresponding to the content to transparent object 134, which redirects the projected images toward the user.

As noted above, computing device 190 can include processing unit(s) 102 and memory 116. Computing device 190 can be a system-on-a-chip (SoC). In various embodiments, computing device 190 can be a head unit included in a vehicle system. In some embodiments, computing device 190, or HUD system 100 overall, can be an aftermarket system or device added to a vehicle. Generally, computing device 190 can be configured to coordinate the overall operation of HUD system 100. The embodiments disclosed herein contemplate any technically feasible system configured to implement the functionality of HUD system 100 via computing device 190. Various examples of computing device 190 include wearable devices (e.g., helmet, headset, glasses, etc.), vehicle computing devices (e.g., head units, in-vehicle infotainment systems, driver assistance systems, aftermarket systems), and so forth.

Processing unit(s) 102 can include a central processing unit (CPU), a digital signal processing unit (DSP), a microprocessor, an application-specific integrated circuit (ASIC), a neural processing unit (NPU), a graphics processing unit (GPU), a field-programmable gate array (FPGA), and/or the like. Each processing unit 102 generally comprises a programmable processor that executes program instructions to manipulate input data. In some embodiments, processing unit(s) 102 can include any number of processing cores, memories, and other modules for facilitating program execution. In some embodiments, processing unit(s) 102 can be configured to execute HUD application 150 to provide heads-up display services. In some embodiments, HUD application 150 can generate images containing content based on information from various sources associated with a vehicle (e.g., navigation system, infotainment system, driver assistance system) and causes the content images to be displayed via the HUD system 100 of the vehicle.

Storage 114 can include non-volatile storage for applications, software modules, and data, and can include fixed or removable disk drives, flash memory devices, and CD-ROM, DVD-ROM, Blu-Ray, HD-DVD, or other magnetic, optical, solid state storage devices, and/or the like. For example, HUD application 150 and database(s) 142 could be stored in storage 114, and then loaded into memory 116 as needed.

Memory 116 can include a memory module or collection of memory modules. Memory 116 generally comprises storage chips such as random access memory (RANI) chips that store application programs and data for processing by processing unit 102. Processing unit(s) 102, I/O device interface 104, and network interface 106 can be configured to read data from and write data to memory 116. HUD application 150 can be loaded from storage 114 into memory 116. While in memory 116, HUD application 150 can be executed by processing unit(s) 102 to implement the functionality described according to the various embodiments in the present disclosure.

Database(s) 142 can store templates, display elements (e.g., textual characters, graphics, shapes, etc.) and/or palettes of display elements, etc. usable by processing unit(s) 102 to generate images for display via HUD system 100 and HUD application 150. That is, database(s) 142 can include one or more repositories of templates, display elements, display element palettes, and/or the like. Database(s) 142 or portions thereof can be stored in storage 114 and loaded into memory 116 as needed. In various embodiments, processing unit(s) 102 can be configured to retrieve templates and/or display elements stored in database(s) 142 to generate images for display. For example, database(s) 142 could store templates, formats, or the like for displaying navigation information via HUD system 100, and display elements usable for displaying navigation information (e.g., alphanumeric characters, symbols, icons, graphics, etc.). HUD application 150 can retrieve these templates and elements and generate images that includes the display elements arranged based on the template to present navigation information. In some embodiments, database(s) 142 may receive periodic updates for at least a portion of the data stored in database(s) 142 (e.g., additional and/or updated fonts for characters, additional and/or updated symbols, additional and/or updated graphics, display elements for additional and/or updated languages, etc.) from a remote computing system (e.g., a cloud computing system or a remote server system) via network interface 106 and a network (not shown). In some embodiments, display elements stored in databases 142 include one or more of: fonts for textual characters, fonts for one or more languages, shapes, icons, graphics, and/or the like. In some embodiments, templates stored in databases 142 include templates for arranging and displaying one or more of: navigation information, vehicle speed information, infotainment media information (media playback information), vehicle state or status information, environmental information (e.g., weather), and/or the like.

In some embodiments, HUD system 100 can be coupled to a sensor array (not shown), which can include one or more sensor devices that perform measurements and/or acquire data related to certain subjects in an environment. Sensor array can include an outward sensor array and/or an inward sensor array. The outward sensor array can include one or more sensor devices configured to perform measurements and/or acquire data related to the exterior of the vehicle (e.g., environment around the vehicle). The inward sensor array can include one or more sensor devices configured to perform measurements and/or acquire data related to the interior of the vehicle (e.g., vehicle cabin, vehicle occupants). Examples of sensor devices include, without limitation, biometric sensors, physiological sensors, imaging sensors, acoustic sensors, environmental sensors, behavioral sensors, imagers, laser sensors, ultrasound sensors, radar sensors, LIDAR sensor, physical sensors (e.g., touch sensors, pressure sensors, position sensors, an accelerometer, an inertial measurement unit (IMU)), motion sensors, etc. The sensor array can generate sensor data associated with a state and/or context of a vehicle, one or more occupants (e.g., driver, passenger) of the vehicle, and/or the environment around the vehicle. For example, the sensor array could collect biometric data related to the driver (e.g., heart rate, brain activity, skin conductance, blood oxygenation, pupil size, eye motion, galvanic skin response, blood-pressure level, average blood glucose concentration, etc.). Additionally or alternatively, the sensor array can generate sensor data associated with a cabin of the vehicle. For example, the sensor array could generate sensor data about the presence of other occupants in the vehicle, the environment within the cabin of the vehicle, operation of the vehicle, and so forth. Further additionally or alternatively, the sensor array can generate sensor data associated with an environment outside of the vehicle. For example, the sensor array could generate sensor data about the weather outside of the vehicle (e.g., outside temperature), detection of objects in proximity of the vehicle (e.g., other vehicles, people, animals, etc.), detection of road features (e.g., lane markers, road signs, etc.), and so forth. More generally, the sensor array can be a source of information for which HUD system 100 can generate images for display. For example, a driver assistance system can process sensor data obtained from the sensor array to generate information, which is passed on to HUD application 150. HUD application 150 can generate images containing content that presents the information obtained from the driver assistance system.

I/O device(s) 130 can include devices capable of receiving input (not shown) (e.g., a keyboard, a mouse, a touch-sensitive screen, a microphone, etc.) for providing input data to computing device 190. I/O device(s) 130 can include devices capable of providing output (e.g., a display screen, one or more speakers, haptic devices, touchless haptic devices, and/or the like. One or more of I/O devices 130 can be incorporated in computing device 190 or can be external to computing device 190. I/O devices 130 can interface with computing device 190 via I/O devices interface 104. In some embodiments, computing device 190 and/or one or more I/O device(s) 130 can be components of a head unit implemented in a vehicle. In some embodiments, HUD application 150 can obtain information from one or more systems and/or sub-systems of the vehicle (e.g., navigation system, infotainment system, driver assistance system) and display that information via HUD system 100. More generally, HUD system 100 (e.g., computing device 190) can interface with other systems of the vehicle to acquire information for display.

In various embodiments, I/O devices 130 include a projection unit 132. Projection unit 132 can project images onto transparent object 134. In particular, projection unit 132 can project images whose propagating light beams reflects off a surface of transparent object 134 toward a user (e.g., a vehicle occupant). In some embodiments, projection unit 132 is an optical collimator. More generally, projection unit 132 can be any technically feasible projection device suitable for a heads-up display system. In some embodiments, projection unit 132 is positioned under transparent object 134 and projects images upward toward transparent object 134. In some embodiments, projection unit 132 can include one or more optical devices (e.g., lens, prisms, mirrors, or the like, or any combination thereof) that can affect a virtual image distance of images projected by projection unit 132. In some embodiments, projection unit 132 can include an actuator or the like that can orient or reorient projection unit 132 or a component thereof (e.g., one or more optical devices in projection unit 132) in order to affect an angle of projection of images from projection unit 132, and correspondingly affect an angle of incidence onto transparent object 134.

Transparent object 134 can be one or more transparent pieces of glass, plastic, or the like that can redirect, by reflection, images projected from projection unit 132 toward a vehicle occupant. In some embodiments, transparent object 134 can reflect light having certain wavelengths while letting other wavelengths pass through. In some embodiments, transparent object 134 can be a windshield of the vehicle, a combiner or a beam splitter installed in the vehicle (e.g., mounted on top of the dashboard, mounted on the windshield), or a visor or lens on a wearable device (e.g., visor on a helmet, lens on smart glasses). In some embodiments, transparent object 134 can include two pieces of glass or plastic, with a transparent interlayer sandwiched in between.

A network (not shown) can enable communications between computing device 190 and other devices in network via wired and/or wireless communications protocols, satellite networks, telephone networks, V2X networks, including Bluetooth, Bluetooth low energy (BLE), wireless local area network (WiFi), cellular protocols, and/or near-field communications (NFC). The network can be any technically feasible type of communications network that allows data to be exchanged between computing device 190 and remote systems or devices, such as a server, a cloud computing system, cloud-based storage, or other networked computing device or system. For example, the network could include a wide area network (WAN), a local area network (LAN), a wireless network (e.g., a Wi-Fi network, a cellular data network), and/or the Internet, among others. Computing device 190 can connect with a network via network interface 106. In some embodiments, network interface 106 is hardware, software, or a combination of hardware and software, which is configured to connect to and interface with one or more networks.

In some embodiments, HUD system 100 can include or be coupled to a location module. A location module can include hardware and/or software components for determining a geographic location of computing device 190 (e.g., a current location of the vehicle). The location module can determine a location of computing device 190 via acquisition of geolocation data (e.g., from a global navigation satellite system, such as a global positioning system (GPS), Glonass, Galileo, Beidou, etc.) and/or determination of location based on sensor data from a sensor array (e.g., dead reckoning). The location module can also cross-reference an acquired and/or determined geographic location with a navigation database, which can be stored in database(s) 142, to determine address information corresponding to the geographic location.

In some embodiments, computing device 190 can pair and communicate with another computing device in proximity. That another computing device can couple to computing device 190 via I/O device interface 104, and/or network interface 106 and one or more networks, using any suitable wired (e.g., USB cable) or wireless (e.g., Bluetooth, Wi-Fi) connection. HUD application 150 on computing device 190 can communicate and interface with applications on that another computing device. For example, HUD application 150 can communicate and interface with a navigation application on that another computing device to obtain navigation information, which HUD application 150 can then use to generate images for display.

In some embodiments, HUD system 100 is an augmented reality display system. HUD system 100 displays content in conjunction with the environment outside (e.g., in front) of the vehicle. That is, HUD system 100 can display content that a vehicle occupant would perceive as being overlaid on the environment outside of the vehicle as seen by the user. For example, HUD application 150 could generate images to indicate a navigational route in front of the vehicle as well as landmarks on the route. HUD application 150 could, in conjunction with images of the environment in front of the vehicle, arrange the content and display the content, so that the user sees the environment and the content together.

Figure 2:
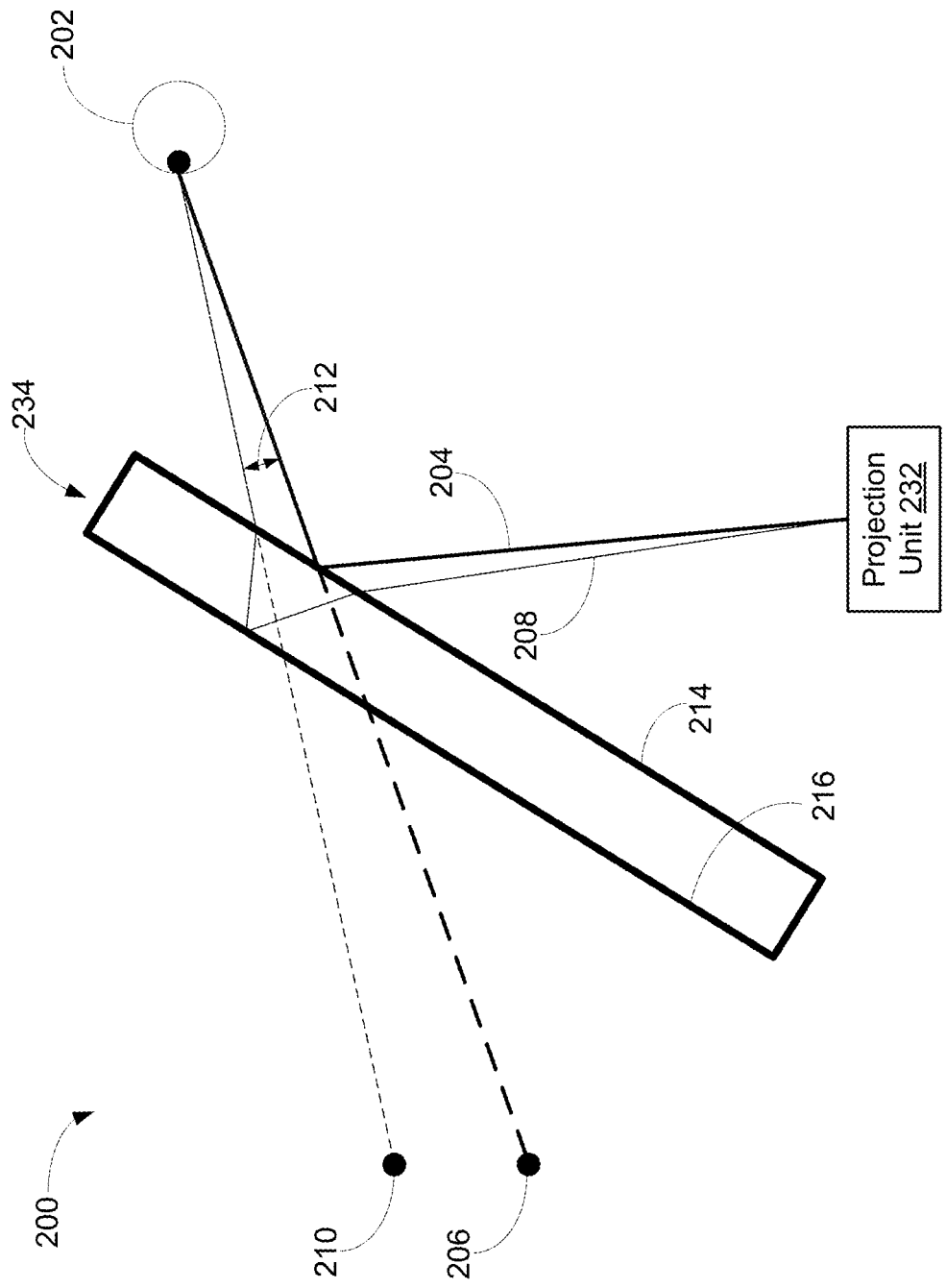
FIG. 2 illustrates the generation of a ghost image in a head-up display system.

FIG. 2 illustrates the generation of a ghost image in a head-up display system. FIG. 2 depicts a HUD content display arrangement 200 that can typically be implemented in a vehicle. As shown, display arrangement 200 includes a projection unit 232 of a HUD system (e.g., HUD system 100). In some embodiments, projection unit 232 is installed or mounted on top of a dashboard of a vehicle, or inside the dashboard but exposed to the top of the dashboard, such as by using one or more mirrors (not shown). Projection unit 232 can project light beams 204 and 208 carrying an image for display, to a transparent object 234 (e.g., a windshield of the vehicle). Transparent object 234 reflects light beam 204 off a first surface 214 of transparent object 234 (e.g., surface of windshield directly exposed to the vehicle cabin) and redirects light beam 204 toward one or more eye(s) 202 of a user (e.g., a vehicle occupant). The user receiving light beam 204 perceives the corresponding image as coming from location 206 beyond transparent object 234.

Additionally, transparent object 234 refracts light beam 208 and then reflects light beam 208 off a second surface 216 of transparent object 234 (e.g., a surface within the windshield glass), and redirects light beam 208 toward eye(s) 202 of the user. The user receiving light beam 208 perceives the corresponding image as coming from location 210 beyond transparent object 234. Because light beam 208 is refracted before reaching eye(s) 202, the image at location 210 can be less intense (e.g., lower brightness) than the image at location 206. The image coming from location 210, which is offset from the original image coming from location 206, is a ghost image of the image coming from location 206. The user, via eye(s) 202 receiving light beams 204 and 208, concurrently can see two copies of the image displayed by the HUD system—the original image coming from location 206 and the ghost image coming from location 210. The offset between the original image and the ghost image (e.g., offset between locations 206 and 210) can be measured as an angular separation 212.

Figure 3:
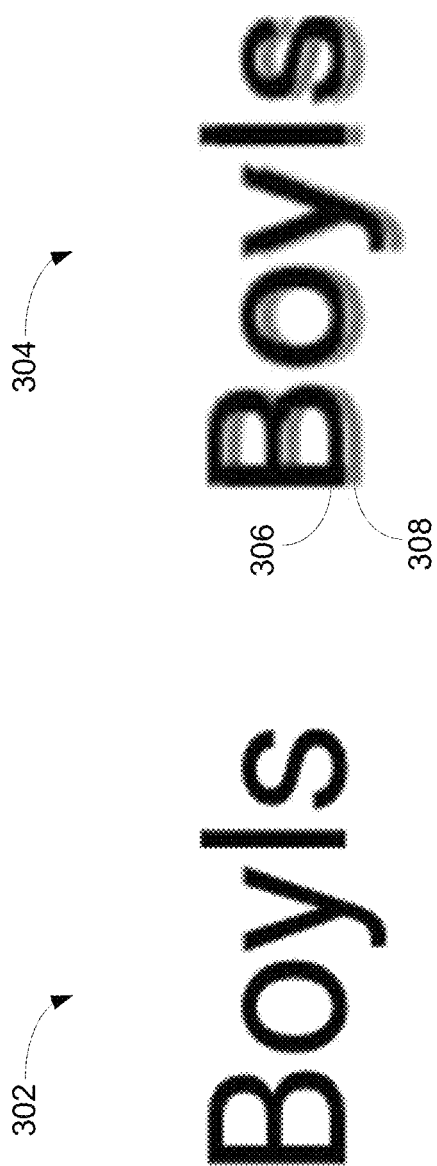
FIG. 3 illustrates an example of a ghost image.

FIG. 3 illustrates an example of a ghost image. FIG. 3 includes an image 302 that includes multiple display elements, namely two-dimensional alphanumeric characters. Image 302 as depicted is an image generated by a HUD system (e.g., HUD system 100) for display, prior to projection by a projection device (e.g., projection unit 132 or 232) of the HUD system. FIG. 3 also includes a perceived image 304 that is a perception of a projection of image 302 by the projection device. Perceived image 304 includes original image 306, corresponding to image 302, and ghost image 308 of original image 306. If image 302 was displayed via arrangement 200, then eye(s) 202 would perceive original image 306 coming from location 206 and ghost image 308 coming from location 210. The larger the angular separation 212 is, the farther apart images 306 and 308 would be.

As shown in FIGS. 2-3, ghost images are an artifact of a typical arrangement for HUD content display in a vehicle. Ghost images can be distracting for the user (e.g., the vehicle operator) and can hinder perception of the original image by the user. Various approaches to mitigating the effects of ghost images are described below.

Figure 4:
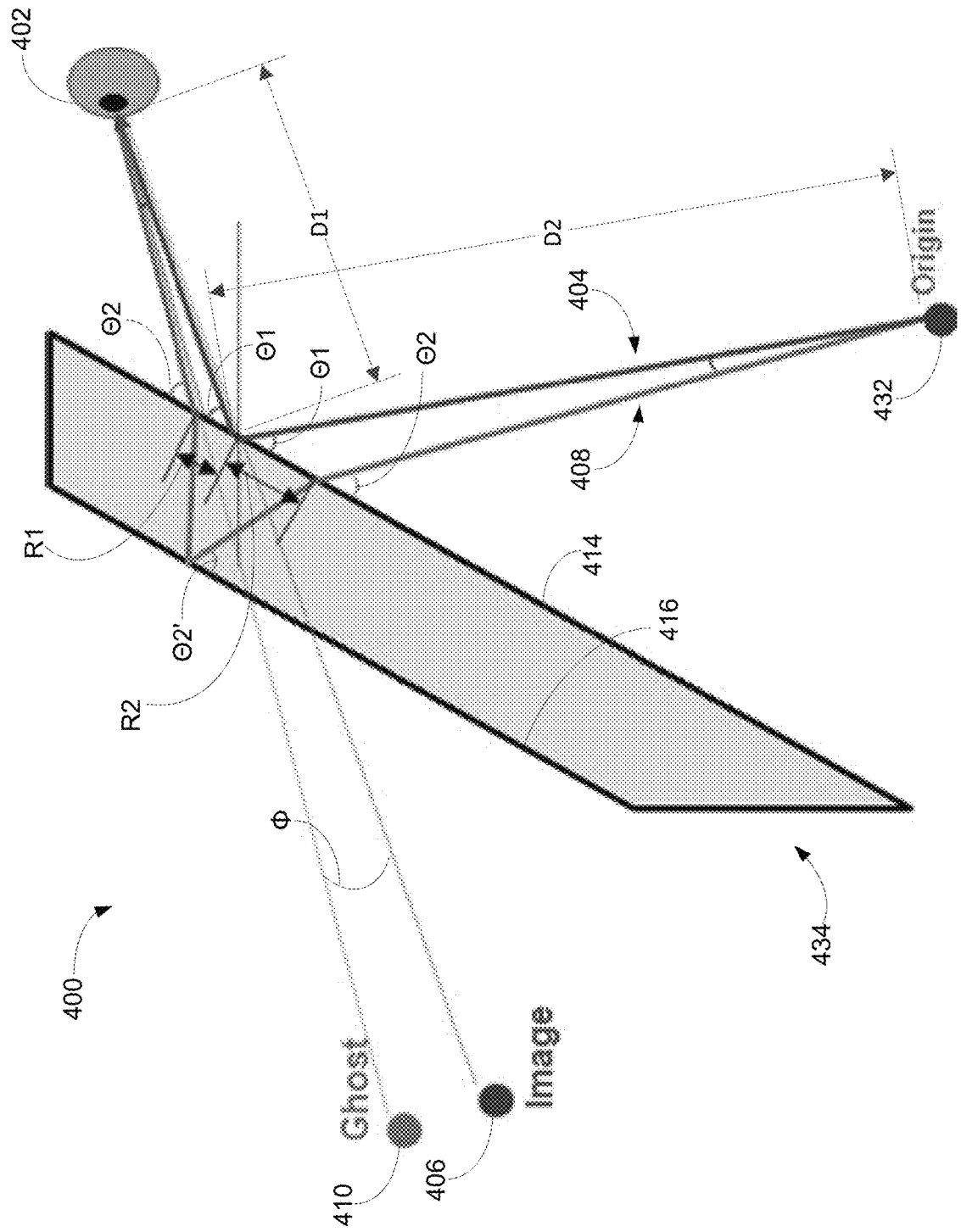
FIG. 4 illustrates an arrangement for controlling one or more parameters between a projection and a user in a head-up display system to reduce the perceivability of a ghost image, according to various embodiments.

FIG. 4 illustrates an arrangement for controlling one or more parameters between a projection and a user in a head-up display system to reduce the perceivability of a ghost image, according to various embodiments. Arrangement 400 is substantially the same as arrangement 200, but arrangement 400 shows one or more parameters associated with projection of images by a projection unit. In arrangement 400, images are projected from an origin 432. Origin 432 can be a projection device (e.g., projection unit 232). An image projected from origin 432 can travel to eye(s) 402 of a user via light beams 404 and 408. Light beam 404 propagates a distance D2 from origin 432, reflects off surface 414 of transparent object 434 at an incidence angle $\theta 1$, and after reflection propagates a further distance D1 to eye 402. Light beam 404 is perceived by eye 402 as the original image coming from location 406.

Light beam 408 propagates from origin 432 to transparent object 434 and hits surface 414 at an incidence angle $\theta 2$. Light beam 408 then is refracted by transparent object 434. Refracted light beam 408 reflects off surface 416 of transparent object 434 at an angle $\theta 2'$, leaves transparent object 434, and propagates to eye 402. Light beam 408 is perceived by eye 402 as a ghost image coming from location 410. The offset between locations 406 and 410 is measured by angle $\theta$, which corresponds to the angular separation 212 in arrangement 200.

In various embodiments, angle $\Phi$ affects the retinal recognizability of the ghost image from location 410 versus the original image from location 406 by eye 402. The smaller angle $\Phi$ is, the less offset location 410 is from location 406, and accordingly the ghost image is closer to the original image and thereby can be less perceivable. Accordingly, to mitigate the ghost image, an approach is to reduce angle $\Phi$ to an amount that is below or at least approaches a minimum recognizability threshold. In various embodiments, that minimum recognizability threshold has been empirically determined to be 1/60 degree (approximately 0.01667°). Accordingly, the approach would include reducing angle $\Phi$ to an amount below 0.01667°.

In arrangement 400, angle $\theta 2'$ can be calculated by Equation 1 as follows:

$$\theta 2' = \cos^{-1}(\cos(\theta 2)/RI) \qquad \text{Equation 1}$$

where RI is a refractive index of transparent object 434, and $\theta 2$ is angle, which can be calculated as $\theta 1 + \Phi$ (angle $\theta 1$ plus angle $\Phi$).

Distance R1, which is a linear distance between the points where light beams 404 and 408 leave surface 414 toward eye 402, can be calculated by Equation 2 as follows:

$$R1 = D1*(\cos(\theta1) - \sin(\theta1)*\cot(\theta2'))\qquad\text{Equation 2}$$

where D1 is distance D1, θ1 is angle θ1, θ2 is angle, and θ2' is calculated by Equation 1.

Distance R2, which is a linear distance between the incidence points of light beams 404 and 408 on surface 414, can be calculated by Equation 3 as follows:

$$R2 = D2*(\cos(\theta1) - \sin(\theta1)*\cot(\theta2'))\qquad\text{Equation 3}$$

Where D2 is distance D2, θ1 is angle θ1, θ2 is angle, and θ2' is calculated by Equation 1.

Angle Φ can be reduced by reducing one or more of the following parameters: a thickness of transparent object 434, a refractive index of transparent object 434, incidence angle θ1 and/or θ2, and a virtual image distance of the image projected from origin 432. In some embodiments, the thickness and/or the refractive index of transparent object 434 can be controlled at the design and manufacturing stages (e.g., selection of material for and design of windshield) but is set once the transparent object 434 is manufactured. In some embodiments, θ1 and/or θ2 can be controlled by placement of origin 432 relative to transparent object 434 at installation, which can be predefined at a design stage. In some embodiments, HUD application 150 can actuate projection unit 232 or an optical device therein to change θ1 and/or θ2.

In some embodiments, angle Φ can be reduced by changing a virtual image distance ("VID"). VID, as used herein, is a virtual distance of the image from eye 402, which corresponds to the distance between location 406 to eye 402. VID can include an actual physical distance or length, an optical distance or length achieved by optical manipulation (e.g., by an optical device in projection unit 232), or a combination thereof. VID can be calculated by Equation 4 as follows:

$$VID = D1 + D2\qquad\text{Equation 4}$$

where D1 is distance D1 and D2 is distance D2. D1 can be an actual physical distance/length or an optical distance/length. Similarly, D2 can be an actual physical distance/length or an optical distance/length. Accordingly, the VID can be adjusted by adjusting one or more of D1 or D2. That is, VID can be adjusted by adjusting one or more of the physical distance or optical distance that make up D1 and/or D2.

Thus, if Equations 1-4 are considered together, in conjunction with the minimum threshold value for angle Φ, a given value of 23.9° for angle θ1, a given value of 1.5168 for refractive index RI of transparent object 434, a given value of 5 mm for the thickness of transparent object 434, and given then a threshold VID can be calculated as follows:

$$\theta2' = \cos^{-1}(\cos(23.9° + 0.01667°)/1.5168) = 52.93834346°$$

$$R1 = D1*(\cos(23.9°) - \sin(23.9°*)\cot(52.93834346°)) = 0.0007175*D1$$

$$R2 = D2*(\cos(23.9°) - \sin(23.9°*)\cot(52.93834346°)) = 0.0007175*D2$$

$$VID = (R1+R2)/0.007175 = (2*5\text{ mm}*\cot(52.93834346°))/0.0007175 = \text{approximately } 10525\text{ mm (10.5 meters)}$$

Based on the above equations, angle θ reduces as the VID increases. Thus, angle θ can be reduced to the minimum threshold or below by increasing the VID. The VID can be increased by adjusting θ1 and/or θ2, and/or adjusting D1 and/or D2. In some embodiments, these parameters (θ1, θ2, D1, and/or D2) can be adjusted via optical manipulation (e.g., an optical device in projection unit 232 causing a larger D2, actuating the optical device to achieve a different θ1) and/or by arrangement of origin 432 (e.g., projection unit 232) and transparent object 434 at the design, manufacturing, and/or implementation stages.

Another approach to mitigating ghost images includes the generation of display elements whose ghost images are less perceivable. Such display elements can include one or more visual characteristics that reduce the perceivability of ghost images. In various embodiments, those visual characteristics include one or more of a gradation effect, a thickness effect, modifications to the borders or boundaries of display elements, and/or modification to horizontal strokes in a font.

Figure 5:
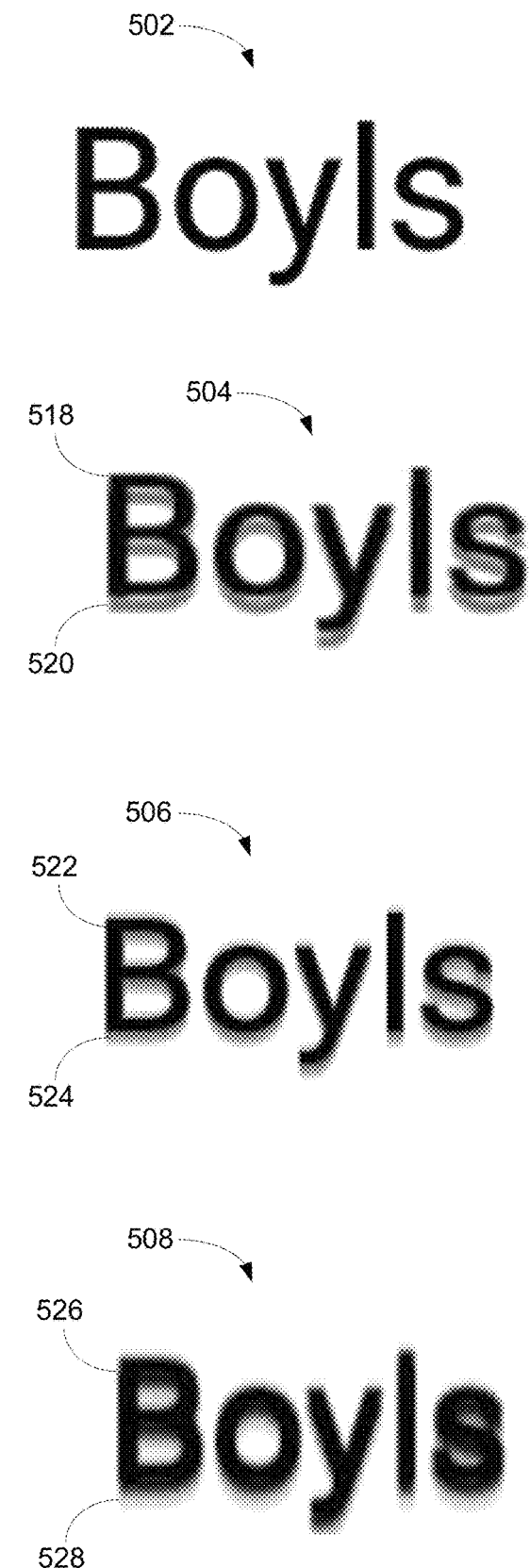
FIG. 5 illustrates an example of a gradation visual characteristic applied to an image that can be displayed by a heads-up display system, according to various embodiments.

FIG. 5 illustrates an example of a gradation visual characteristic applied to an image that can be displayed by a heads-up display system, according to various embodiments. In various embodiments, display elements stored in database 142 includes two-dimensional characters, graphics, and/or the like. When a two-dimensional display element is projected by a projection unit, a ghost image of the display element can be perceived, an example of which is shown in FIG. 3. In some embodiments, a display element can be designed, generated, and/or modified to have a gradation visual characteristic, which can reduce the perceivability of the ghost image.

FIG. 5 includes an image 502. Image 502 includes multiple two-dimensional display elements, namely alphanumeric characters, before projection by a projection device and before any visual characteristic is applied or added. A gradation visual characteristic can be added to the alphanumeric characters in image 502.

Image 504 illustrates how image 502, before any modifications and as projected by a projection device (e.g., projection unit 232) by way of a transparent object (e.g., transparent object 234). Image 504 includes original image 518, corresponding to image 502, and ghost image 520 of original image 518.

FIG. 5 also includes image 506, which shows image 502 with a gradation visual characteristic added. In some embodiments, a gradation visual characteristic includes duplicating or extending the display element vertically downward (e.g., 5 pixels downward) from the original display element, but with intensity and/or color of the duplication or extension decreasing or degrading along a gradation, as if the display element is fading. An intensity degradation along the gradation can be linear or non-linear. A color degradation along the gradation can be monotonic. As shown, image 506 includes display elements 522 and gradation 524 of display elements 522. Gradation 524 extends downward from display elements 522 with degrading intensity. More generally, the display element can be duplicated or extended downward or upward based on the direction of the ghost image relative to the original image. The ghost image can be located upward or downward from the original image based on one or more factors, including for example and without limitation a design and/or implementation of transparent object 234 (e.g., a design and/or implementation of the windshield, such as shape, curvature, slope, thickness, etc.). To apply the gradation visual characteristic, the display element can be duplicated or extended in the direction of the ghost image, which can be upward or downward. Accordingly, the gradation (e.g., gradation 524) extends in the direction of the ghost image, thereby making the ghost image less distinguishable. In some embodiments, a direction of the ghost image relative to the original image can be determined empirically. In some embodiments, HUD application 150 can determine a direction of the ghost image relative to the original image via one or more sensor devices (e.g., an imaging device directed at transparent object 234 and capturing a view of the original and ghost images). Further, in some embodiments, the amount of gradation to be applied (e.g., how many pixels to extend, the rate of degradation) can vary from display element to display element, or image to image, depending on one or more factors or criteria, including without limitation a size of the ghost image and/or the amount of separation (e.g., angular separation 212) between the ghost image and the original image. HUD application 150 can determine the size of the ghost image and/or the amount of separation via one or more sensor devices (e.g., an imaging device directed at transparent object 234 and capturing a view of the original and ghost images).

FIG. 5 further includes image 508, which shows image 506 as projected by the projection device by way of the transparent object. Image 508 includes display elements 526, with a gradation visual characteristic applied, of image 506. Image 508 also includes a ghost image 528 of image 506. As shown, ghost image 528 is less apparent and less perceivable than ghost image 520 in image 504.

In some embodiments, a display element can be pre-designed to include a gradation visual characteristic and stored in database 142 with the gradation visual characteristic. In some embodiments, a display element can be generated or modified by HUD application 150 to include the gradation visual characteristic. For example, HUD application 150 can, as part of the process for generating content for display, retrieve a display element from database 142, and generate a modified version or copy of the display element by applying a gradation effect to the display element. As described above, applying a gradation effect can include extending or duplicating the display element in the direction of the ghost image with a degrading intensity. In some embodiments, a gradation visual characteristic can be applied to any display element (e.g., alphanumeric characters based on a typeface, textual characters, graphics, shapes, icons, etc.).

Figure 6:
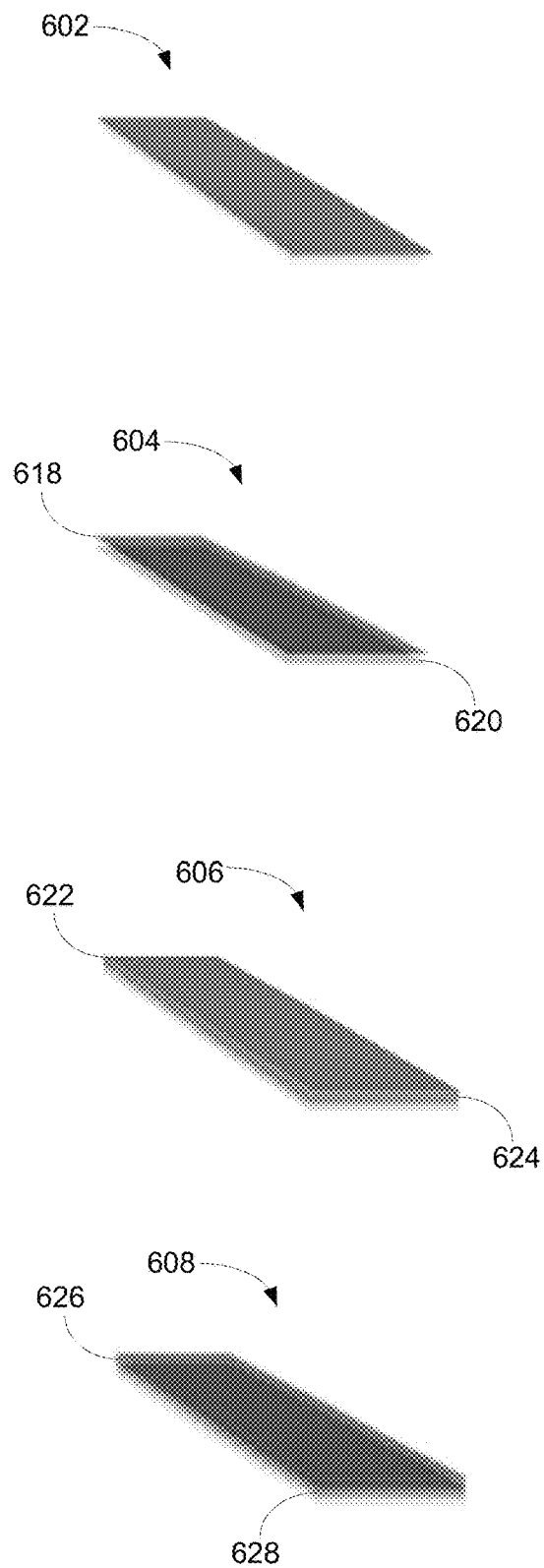
FIG. 6 illustrates an example of a thickness visual characteristic applied to an image that can be displayed by a heads-up display system, according to various embodiments.

FIG. 6 illustrates an example of a thickness visual characteristic applied to an image that can be displayed by a heads-up display system, according to various embodiments. In some embodiments, a display element can be designed, generated, and/or modified to have a thickness visual characteristic, which can reduce the perceivability of the ghost image.

FIG. 6 includes an image 602. Image 602 includes a two-dimensional display element, namely a shape, before projection by a projection device and before any visual characteristic is applied or added. A thickness visual characteristic can be added to the shape in image 602.

Image 604 illustrates how image 602, before any modifications and as projected by a projection device (e.g., projection unit 232) by way of a transparent object (e.g., transparent object 234). Image 604 includes original image 618, corresponding to image 602, and ghost image 620 of original image 618.

FIG. 6 also includes image 606, which shows image 602 with a thickness visual characteristic added. In some embodiments, a thickness visual characteristic includes duplicating or extending the display element vertically downward (e.g., 5 pixels downward) from the original display element, but with constant intensity, as if extending the display element into a third dimension and turning the display element into a three-dimensional (3D) or pseudo-3D object, thereby giving the display element an apparent shape thickness. As shown, image 606 includes display element 622 with thickness 624. Thickness 624 of display element 622 extends downward from display element 622 with constant intensity. More generally, the display element can be duplicated or extended downward or upward based on the direction of the ghost image relative to the original image. The ghost image can be located upward or downward from the original image based on one or more factors, including for example and without limitation a design and/or implementation of transparent object 234 (e.g., a design and/or implementation of the windshield, such as shape, curvature, slope, thickness, etc.). To apply the thickness visual characteristic, the display element can be duplicated or extended in the direction of the ghost image, which can be upward or downward. Accordingly, the thickness (e.g., thickness 624) extends in the direction of the ghost image, thereby making the ghost image less distinguishable. In some embodiments, a direction of the ghost image relative to the original image can be determined empirically. In some embodiments, HUD application 150 can determine a direction of the ghost image relative to the original image via one or more sensor devices (e.g., an imaging device directed at transparent object 234 and capturing a view of the original and ghost images). Further, in some embodiments, the amount of thickness to be applied (e.g., how many pixels to extend) can vary from display element to display element, or image to image, depending on one or more factors or criteria, including without limitation a size of the ghost image and/or the amount of separation (e.g., angular separation 212) between the ghost image and the original image. HUD application 150 can determine the size of the ghost image and/or the amount of separation via one or more sensor devices (e.g., an imaging device directed at transparent object 234 and capturing a view of the original and ghost images).

FIG. 6 further includes image 608, which shows image 606 as projected by the projection device by way of the transparent object. Image 608 includes display element 626, with the thickness visual characteristic applied, of image 606. Image 608 also includes a ghost image 628 of image 606. As shown, ghost image 628 is less apparent and less perceivable than ghost image 620 in image 604.

In some embodiments, a display element can be pre-designed to include a thickness visual characteristic and stored in database 142 with the thickness visual characteristic. In some embodiments, a display element can be generated or modified by HUD application 150 to include a thickness visual characteristic. For example, HUD application 150 can, as part of the process for generating content for display, retrieve a display element from database 142, and generate a modified version or copy of the display element by applying a thickness effect to the display element. As described above, applying a thickness effect can include extending or duplicating the display element in the direction of the ghost image with a constant intensity. In some embodiments, applying a thickness effect can include generating a 3D or pseudo-3D version of the display element. In some embodiments, a thickness visual characteristic can be applied to any non-textual, non-alphanumeric display element (e.g., graphics, icons, shapes, etc.).

In some embodiments, application of the thickness visual characteristics depends on the location on transparent object 434 where the display element is to be displayed. A display element that is to be displayed further up on transparent object 434 (e.g., further up on the windshield) can have a larger thickness visual characteristic applied than a display element that is further down on the windshield.

Figure 7:
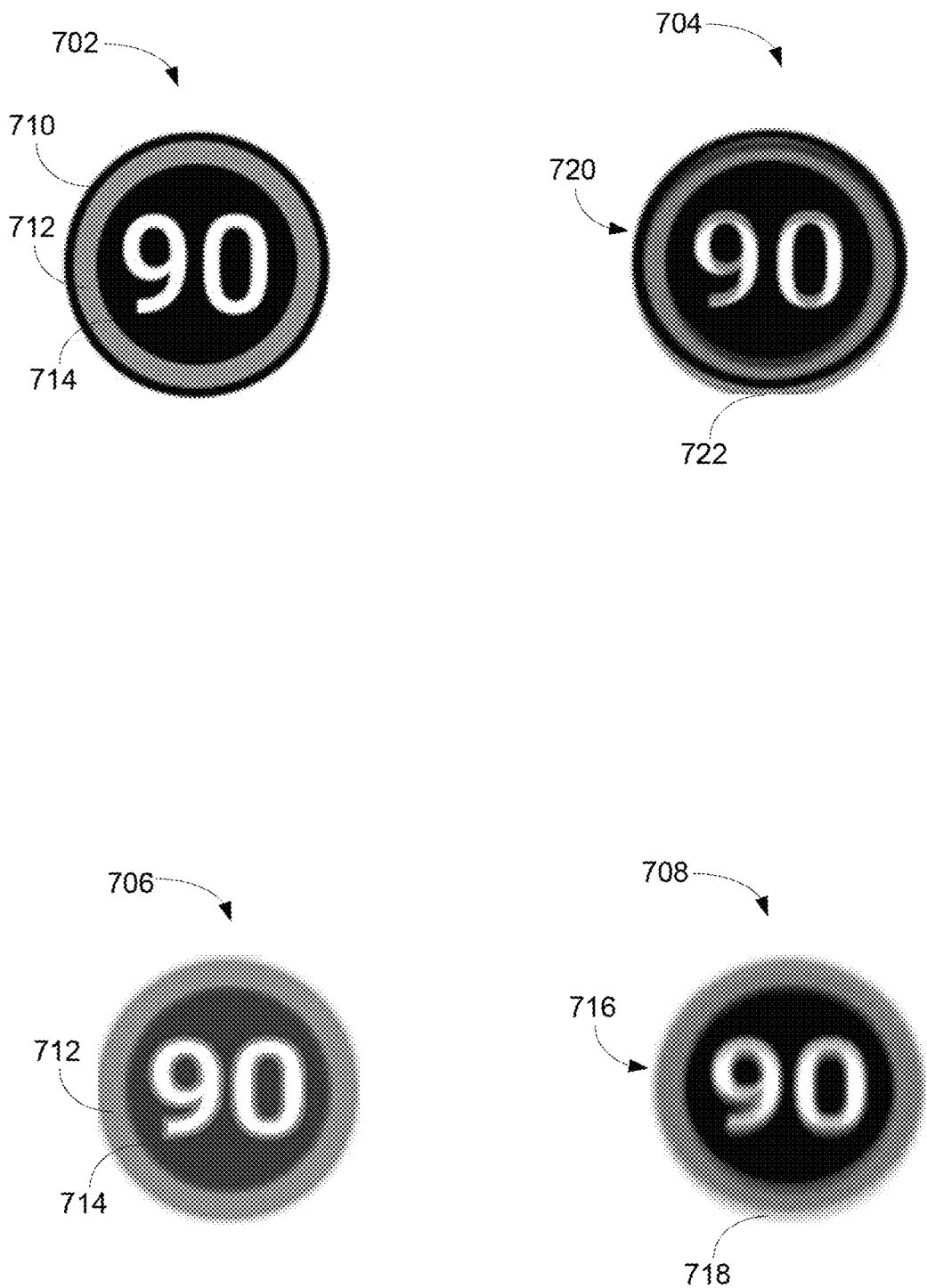
FIG. 7 illustrates an example of a border modification visual characteristic applied to an image that can be displayed by a heads-up display system, according to various embodiments.

FIG. 7 illustrates an example of a border modification visual characteristic applied to an image that can be displayed by a heads-up display system, according to various embodiments. In some embodiments, a display element can be designed, generated, and/or modified to have modified borders, which can reduce the perceivability of the ghost image.

FIG. 7 includes an image 702. Image 702 includes a two-dimensional image resembling a road sign, before projection by a projection device and before any visual characteristic is applied or added. The road sign includes an outer border ring 710, an inner ring 712, and an inner circle 714 that includes alphanumeric characters.

Image 704 illustrates how image 702, before any modifications and as projected by a projection device (e.g., projection unit 232) by way of a transparent object (e.g., transparent object 234). Image 704 includes original image 720, corresponding to image 702, and ghost image 722 of original image 720.

FIG. 7 also includes image 706, which shows image 702 with modifications to borders in the road sign of image 702. In some embodiments, borders modification includes removing a border, adding a border, changing a color of a border (e.g., black to gray, gray to gray and white), changing a shade of a border (e.g., mute a color shade of the border), and/or changing an intensity (e.g., brightness) of a border. More generally, a display element or image can be modified to reduce a color contrast and/or to put in place smoother color transitions between portions of the display element or image. As shown, image 706 shows border 710 removed and a border added to the alphanumeric characters included in circle 714.

FIG. 7 further includes image 708, which shows image 706 as projected by the projection device by way of the transparent object. Image 708 includes road sign 716 of image 706, including the border modifications. Image 708 also includes a ghost image 718 of image 706. As shown, ghost image 718 is less apparent and less perceivable than ghost image 722 in image 704.

In some embodiments, a display element or an image can be pre-designed to have reduced color contrast across portions of the display element or image and stored in database 142 with the reduced color contrast. In some embodiments, a display element or image can be generated or modified by HUD application 150 to have border modifications in order to reduce the color contrast. For example, HUD application 150 can, as part of the process for generating content for display, retrieve a graphic from database 142, and generate a modified version or copy of the graphic with modified borders. In some embodiments, HUD application 150 can analyze an image or display element to determine a color contrast between portions. For example, HUD application 150 can analyze a color histogram of the image or display element to determine color and/or shade differences between portions of the image or display element and identify colors or shades that can reduce those differences or serve as transition points between those differences. As described above, borders modification includes removing a border, adding a border, changing a color of a border, changing a shade of a border, and/or changing an intensity (e.g., brightness) of a border. In some embodiments, border modifications to reduce color contrast can be applied to any image or display element (e.g., textual characters, alphanumeric characters, graphics, icons, shapes, etc.).

In some embodiments, additional visual characteristics can be applied to an image or display element. For example, a textual character of a font (e.g., alphanumeric character, ideogram character, etc.) can be modified by reducing the two-dimensional thickness of horizontal strokes in the character. As used herein, a horizontal stroke of a character is a linear or curved stroke, or a linear or curved portion of a stroke, that travels substantially horizontally. For example, in the character "S", the horizontal strokes include the curves on the top and the bottom of the character. In some embodiments, a stroke or stroke portion can angularly diverge from true horizontal by a threshold percentage (e.g., 10%, 15%) and be considered a horizontal stroke or stroke portion. Those strokes and/or stroke portions are reduced in thickness to make them thinner relative to the remainder of the character. It should be appreciated that the thickness described here is distinct from the thickness visual characteristic described above in conjunction with FIG. 6. In FIG. 6, the thickness visual characteristic is applied by extending or duplicating a two-dimensional shape into a third dimension, giving the two-dimensional shape a perceived shape thickness. For thickness reduction in a textual character, the stroke thickness reduction remains in the two dimensions of the characters in the font. Further, in some embodiments, stroke thickness modification in a font is used in combination with at least one of the other visual characteristics and/or modifications described above (e.g., gradation). In some embodiments, the amount of reduction of the thickness of a horizontal stroke (e.g., reduce a thickness of a horizontal stroke by how many pixels or points) can vary from character or character depending on one or more factors or criteria, including without limitation a size of the ghost image and/or the amount of separation (e.g., angular separation 212) between the ghost image and the original image. HUD application 150 can determine the size of the ghost image and/or the amount of separation via one or more sensor devices (e.g., an imaging device directed at transparent object 234 and capturing a view of the original and ghost images).

Figure 8:
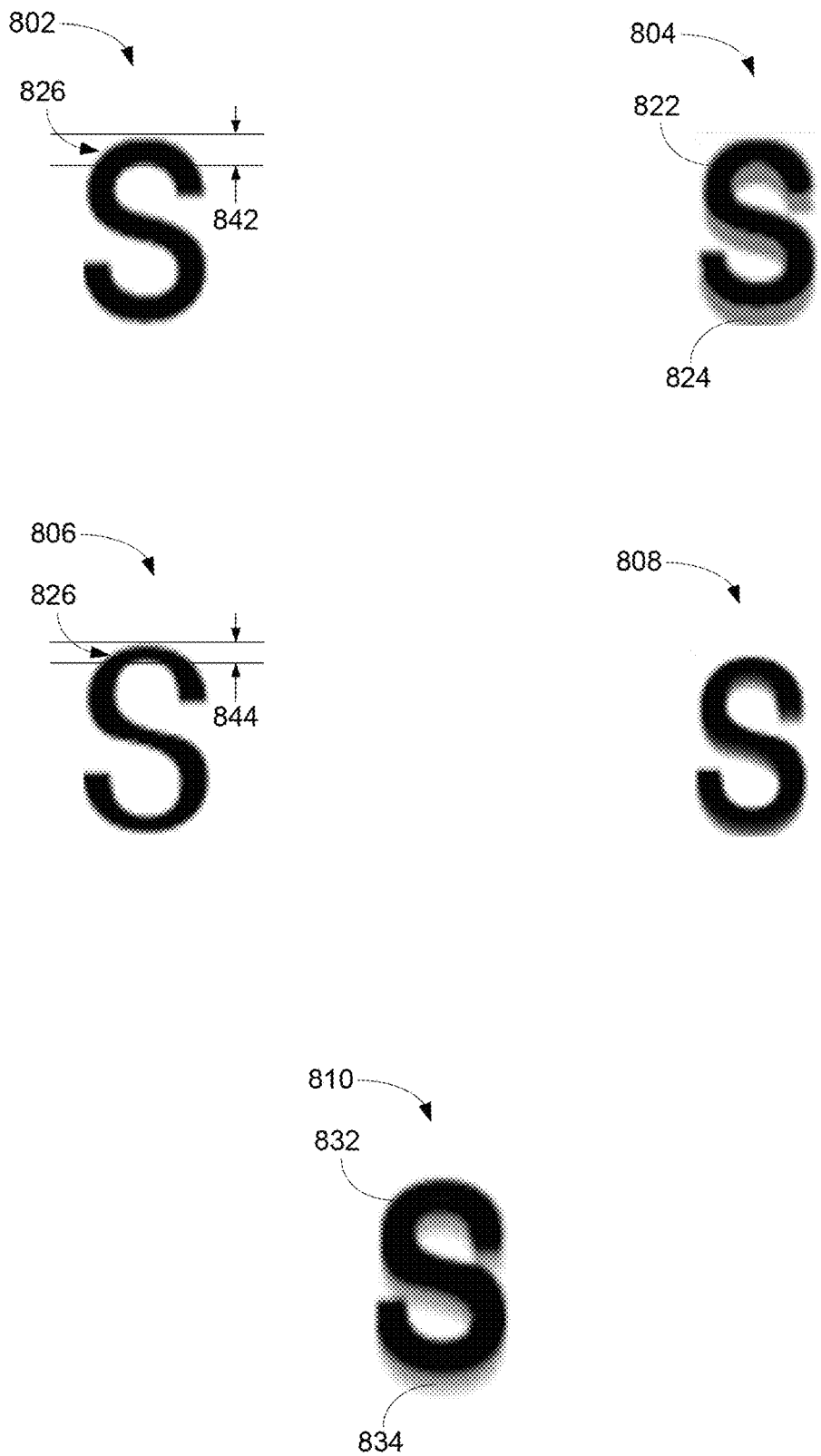
FIG. 8 illustrates an example of a font modification visual characteristic applied to an image that can be displayed by a heads-up display system, according to various embodiments.

FIG. 8 illustrates an example of a font modification visual characteristic applied to an image that can be displayed by a heads-up display system, according to various embodiments. As described above, a font for text can be modified to reduce the stroke thickness of horizontal strokes.

FIG. 8 includes an image 802. Image 802 includes an alphanumeric character "S" before projection by a projection device (e.g., projection unit 232) and before any visual characteristic is applied or added. The "S" as shown includes a horizontal stroke 826 with stroke thickness 842.

Image 804 illustrates how image 802, before any modifications and as projected by a projection device (e.g., projection unit 232) by way of a transparent object (e.g., transparent object 234). Image 804 includes original image 822, corresponding to image 802, and ghost image 824.

FIG. 8 also includes images 806, 808, and 810. Image 806 includes the same character "S" as in image 802, before projection, but with the stroke thickness of horizontal stroke 826 reduced from stroke thickness 842 to stroke thickness 844. Image 808 shows the character "S", as modified in image 806 to include stroke thickness 844, and additionally with a gradation visual characteristic applied.

Image 810 shows image 808 as projected by the projection device by way of the transparent object. Image 810 includes original image 832, corresponding to image 808, and ghost image 834. As shown, ghost image 834 is less apparent and less perceivable than ghost image 824 in image 804.

In some embodiments, an original image and a ghost image perceived together can appear to the user to be a distortion of the original image in a vertical direction due to the ghost image appearing vertically relative to the original image. In some embodiments, the original image can be modified to change (e.g., reduce) a two-dimensional thickness of one or more horizontal lines or strokes or portions thereof, linear or curved, in the display element or image (e.g., the bottom curve of a ring). When the modified original image and the ghost image of the modified original image are perceived together, the modified horizontal portion in the modified original image and the corresponding portion in the ghost image of the modified original image are perceived together and give an appearance of a thickness that more resembles the thickness of the portion in the original image before modification. Again, it should be appreciated that the stroke thickness described here is distinct from the shape thickness visual characteristic described above in conjunction with FIG. 6.

In some embodiments, an image or display element can have one or more of the described visual characteristics and/or modifications applied. For example, a graphic can have the gradation and/or shape thickness visual characteristics applied. Textual characters can have the gradation, color contrast (border modification), and/or horizontal stroke thickness modification visual characteristics applied.

In some embodiments, HUD application 150 can modify a display element or image in real-time or near real-time (e.g., as the images for display are being generated) to apply the above-described visual characteristics to display elements.

In some embodiments, HUD application 150 can modify a display element or image by different amounts depending on one or more parameters. For example, various parameters, such as time of day (e.g., before or after sunrise or sunset), outside weather (e.g., sunny, cloudy, raining), amount of ambient light entering the vehicle cabin, and/or the like, can affect perceivability of ghost images. Also, a display location of the display element or image (e.g., closer to top, middle, or bottom of windshield, closer to driver side or passenger side of windshield) can also affect perceivability of ghost images. HUD application 150 can obtain data regarding such parameters from one or more sensor devices (e.g., imaging device, driver monitoring sensor) and adjust the amount(s) and/or type(s) of visual characteristic(s) to apply to the display element or image. In some embodiments, database(s) 142 can have multiple versions of a display element or image, each with different amount(s) and/or type(s) of visual characteristic(s) applied. HUD application 150 can, based on the above-described parameters, select a suitable version of the display element or image for display. Also, in some embodiments, HUD application can select a different version and/or apply different amount(s) and/or type(s) of visual characteristics depending on the implementation of HUD system 100 (e.g., projection onto windshield or a separate combiner, projection intensity of projection device, etc.).

Figure 9A:
FIGS. 9A-9D illustrate an example of an image displayed by a heads-up display system, showing the effects of one or more ghost image mitigation characteristics on images displayed by a head-up display system, according to various embodiments.

FIGS. 9A-9D illustrate an example of an image displayed by a heads-up display system, without and with one or more ghost image mitigation characteristics, according to various embodiments. FIG. 9A shows an image 900 as projected by projection unit 232 of a HUD system by way of transparent object 234. Image 900 includes navigation information that could be presented to a vehicle driver, to aid the driver in operating the vehicle. In some embodiments, the navigation information is obtained by HUD application 150 from a navigation system or navigation-capable device (e.g., an in-vehicle navigation system, a mobile device) communicatively coupled to computing device 190.

Image 900 includes, for example, speed information 902, where a current vehicle speed is presented as text and a speed limit for the road being travelled is presented as a road sign graphic 912 with text. The current speed indication includes alphanumeric characters 920 and a ghost image 922 thereof. Road sign graphic 912 includes original road sign graphic 928 and a ghost image 930 thereof. Image 900 can also include next turn information 904, presented as a combination of graphics and text, as well as a graphic 906 indicating the upcoming path for the vehicle. For example, next turn information 904 includes a turn arrow graphic 924 and a ghost image 926 thereof. Graphic 906 includes original graphic 908 and a ghost image 910 thereof. Image 900 does not include any of the visual characteristics or modifications for mitigating ghost images, as described above. Accordingly, a ghost image of image 900 is perceivable. For example, graphic 906 has ghost image 910.

Figure 9B:
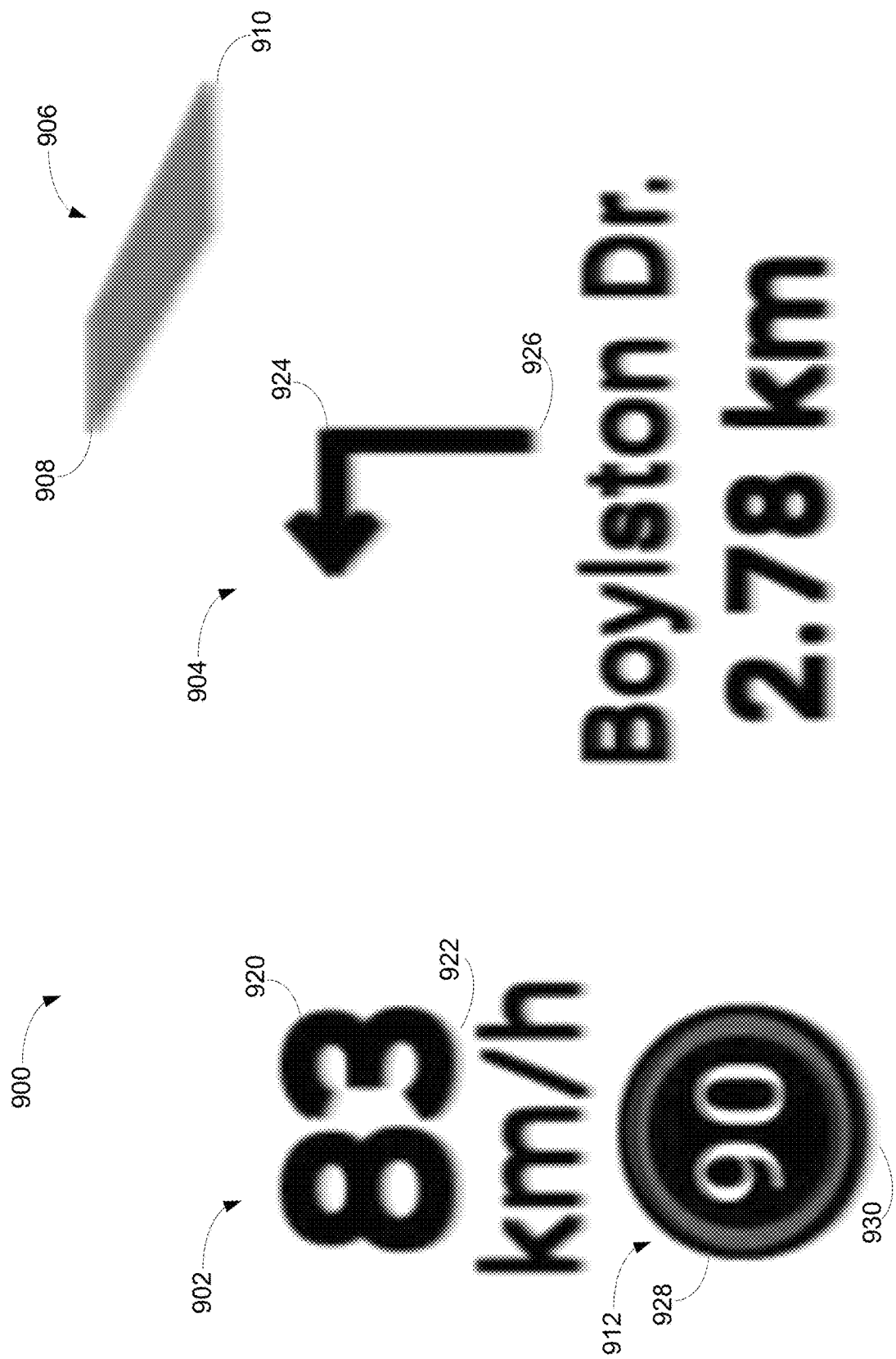

FIG. 9B shows image 900, where one or more of the display elements included in image 900 has the gradation visual characteristic applied. For example, the gradation visual characteristic could be applied to the text and/or graphic in speed information 902, the text and/or graphic in next turn information 902, and/or to graphic 906 indicating the upcoming path. As shown in FIG. 9B, ghost images 910, 922, 926, and 930 are less apparent compared to FIG. 9A. For example, in speed information 902, ghost image 922 of alphanumeric characters 920 is less perceivable compared to FIG. 9A. For turn arrow graphic 924, ghost image 926 is less perceivable compared to FIG. 9A.

Figure 9C:
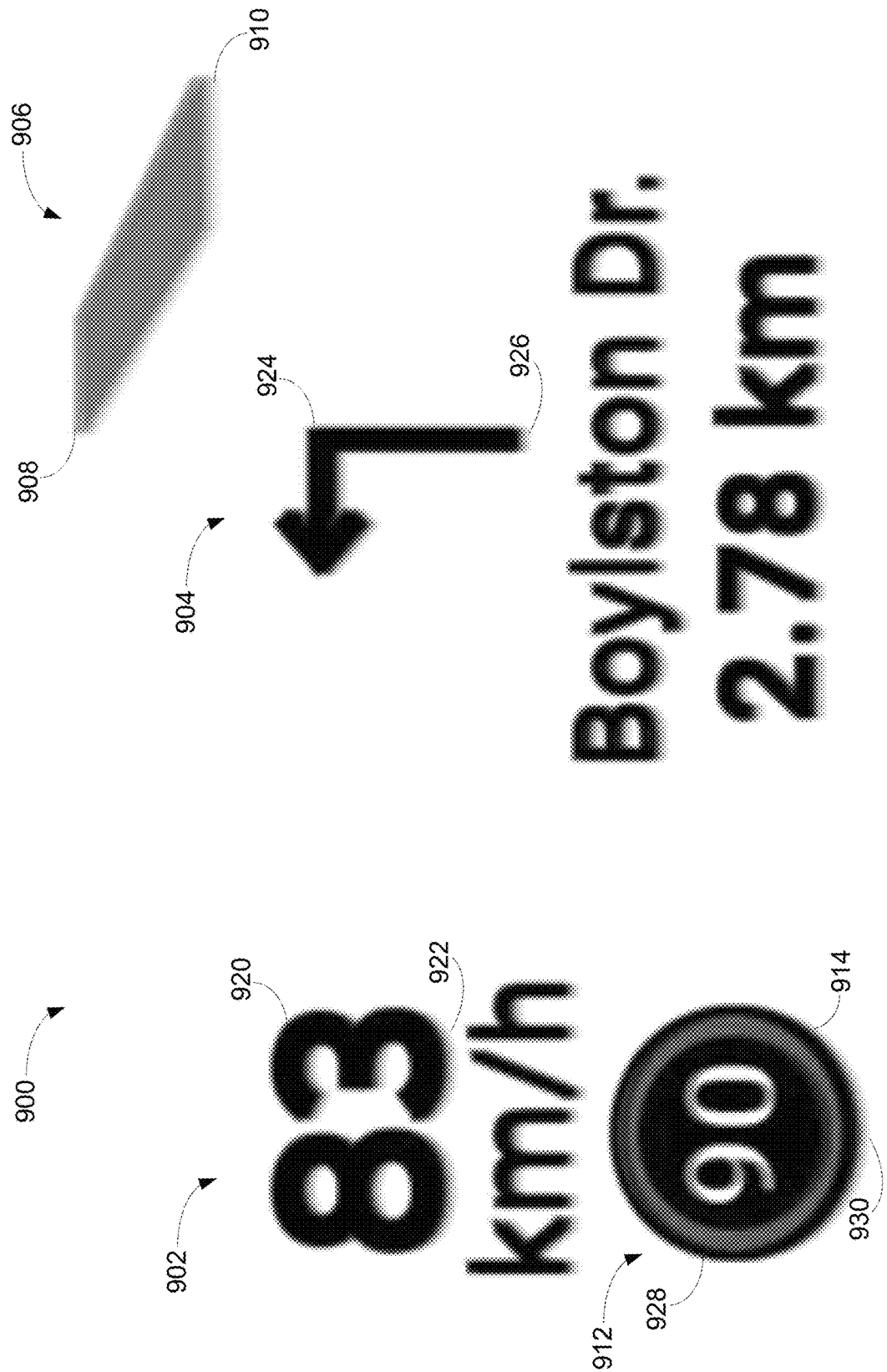

FIG. 9C shows image 900, where one or more of the display elements included in image 900 has the thickness visual characteristic applied, in addition to the visual characteristics applied in FIG. 9B. For example, the thickness visual characteristic could be applied to the graphic in speed information 902, the graphic in next turn information 902, and/or to graphic 906 indicating the upcoming path. As shown in FIG. 9C, ghost images 910, 922, 926, and 930 are less apparent distinguishable compared to FIG. 9A. For example, in speed information 902, ghost image 922 of alphanumeric characters 920 is less perceivable compared to FIG. 9A. For turn arrow graphic 924, ghost image 926 is less perceivable compared to FIG. 9A.

Figure 9D:
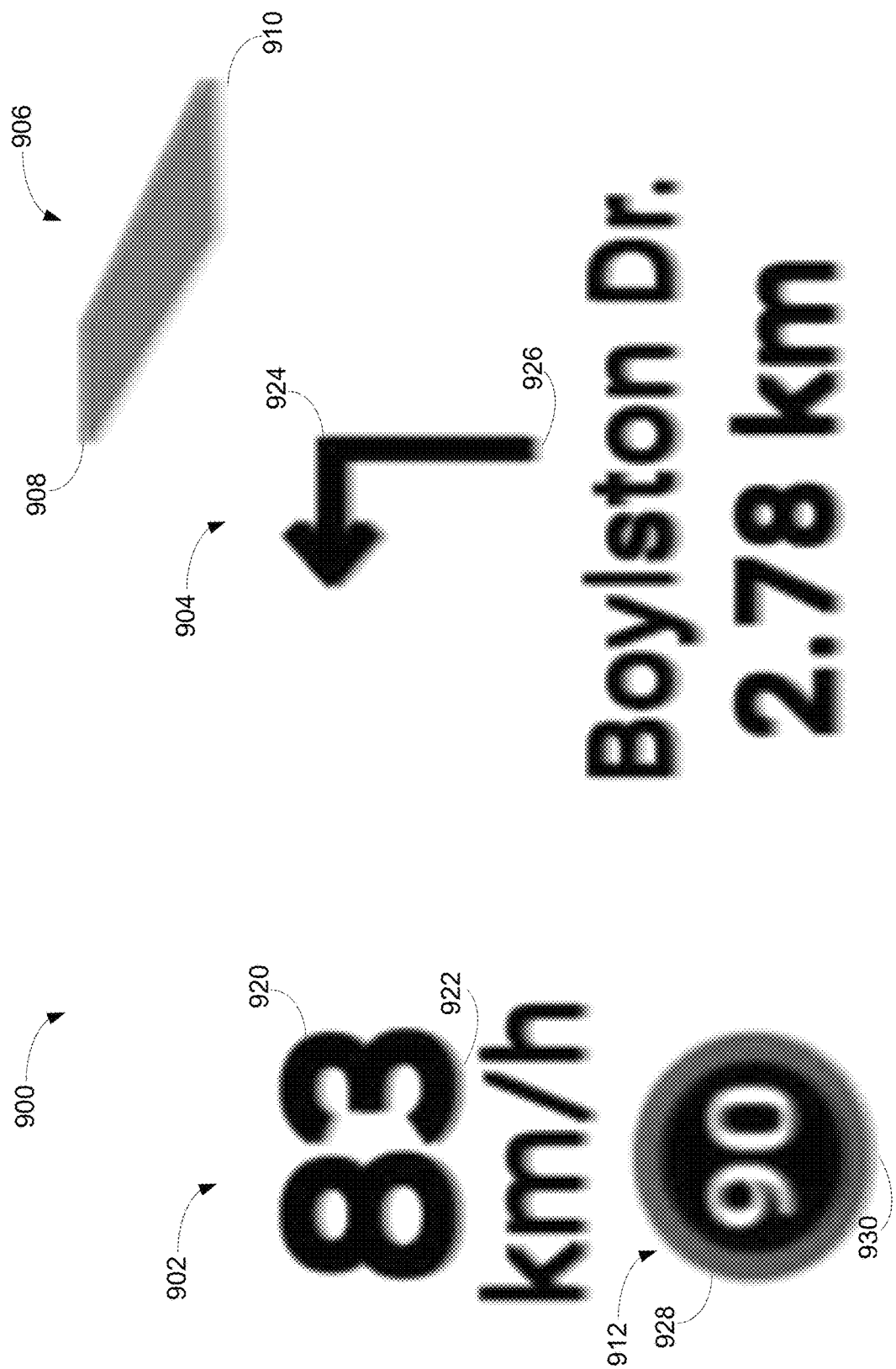

FIG. 9D shows image 900, where one or more of the display elements included in image 900 has border modifications applied, in addition to the visual characteristics applied in FIGS. 9B and 9C. For example, road sign graphic 912 in speed information 902 could be modified to remove outer border ring 914 (FIG. 9C). With the application of visual characteristics and modifications across FIGS. 9C-9D, the ghost image(s) of image 900 (e.g., ghost images 910, 922, 926, and 930) are less perceivable compared to FIG. 9A. For example, in speed information 902, ghost image 922 of alphanumeric characters 920 is less perceivable compared to FIG. 9A. For turn arrow graphic 924, ghost image 926 is less perceivable compared to FIG. 9A. For road sign graphic 912, ghost image 930 is less perceivable compared to FIG. 9A.

Figure 10:
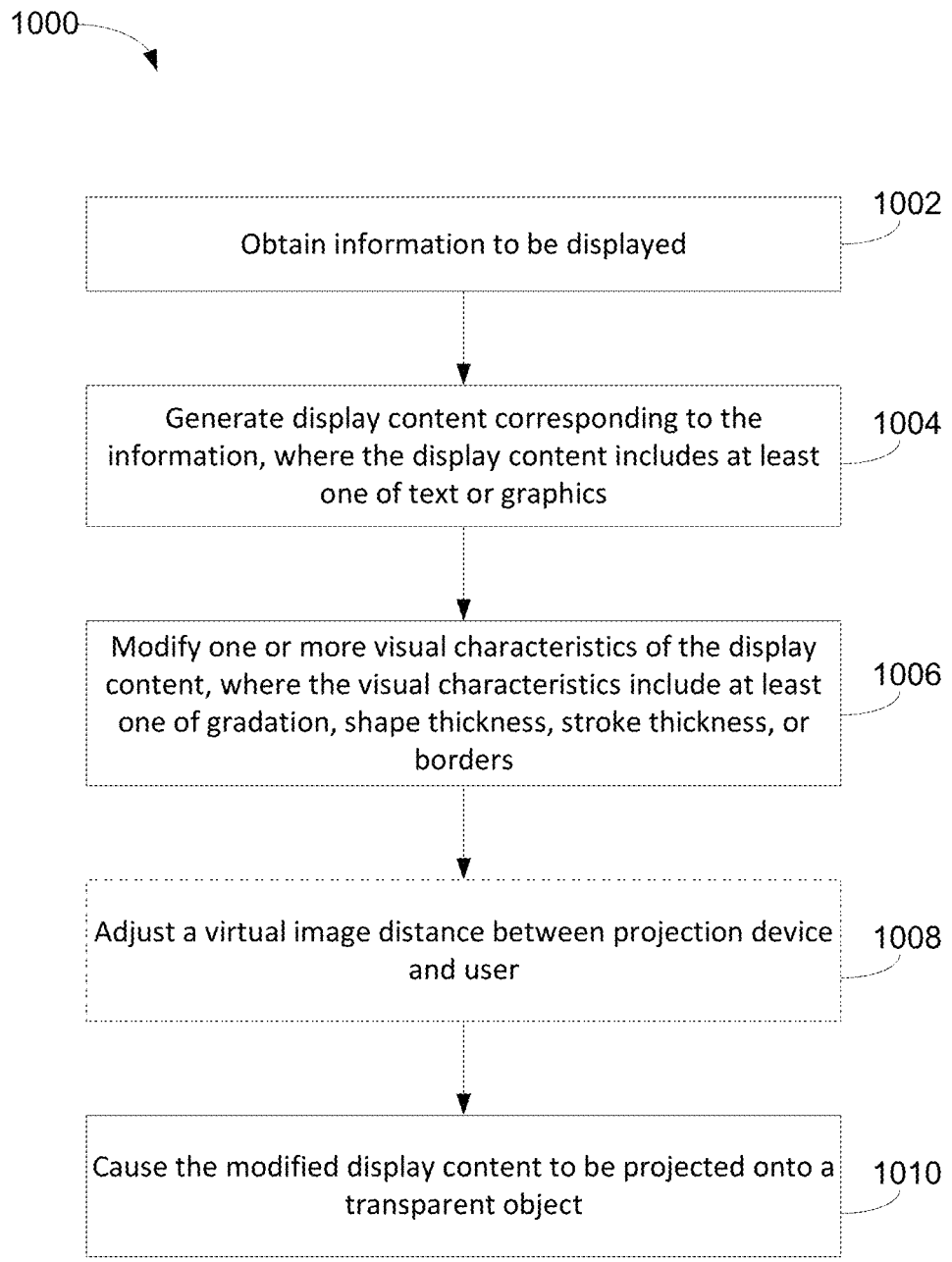
FIG. 10 is a flow diagram of method steps for displaying content via a heads-up display system, according to various embodiments.

FIG. 10 is a flow diagram of method steps for displaying content via a heads-up display system, according to various embodiments. Although the method steps are described with respect to the systems and embodiments of FIGS. 1 and 4-9D, persons skilled in the art will understand that any system configured to perform the method steps, in any order, falls within the scope of the various embodiments.

As shown, a method 1000 begins at step 1002, where HUD application 150 obtains information to be displayed. HUD application 150 can obtain information for display from any suitable system or device. For example, HUD application 150 can obtain (e.g., have transmitted to HUD application) navigation information (e.g., current road, current speed, speed limit, next turn, etc.) from a navigation system or device.

At step 1004, HUD application 150 generates display content corresponding to the information, where the display content includes at least one of text or graphics. HUD application 150 generates one or more images to be projected by projection unit 132 to transparent object 134. The generated images formats and presents (e.g., visualizes) the information obtained in step 1002, and can include text and/or graphics to present the information. HUD application 150 can generate the images by retrieving one or more display elements and templates from database(s) 142 and arranging the display elements within the template to present the information. For example, the template could be a template for presenting navigation information, and design elements could include graphics for indicating turns and speed limits, as well as a text font or typeface for use with the template.

At step 1006, HUD application 150 modifies one or more visual characteristics of the display content, where the visual characteristics include at least one of gradation, shape thickness, stroke thickness, or borders. HUD application 150 can modify the images generated in step 1004 to modify one or more of gradation, shape thickness, stroke thickness, or borders in the text and/or graphics in the images. For example, HUD application 150 could modify the textual characters in the images to add gradation and/or to reduce the stroke thickness of horizontal strokes. As another example, HUD application 150 could modify the graphics (e.g., icons, shapes, etc.) in the images to add gradation, add shape thickness, modify the borders, and/or to reduce the stroke thickness of horizontal strokes. HUD application 150 can include (e.g., insert) the modified content in the content generated in step 1004.

In some embodiments, a display element retrieved from a repository of display elements in database 142 may already have such modifications pre-designed into the display element. In such a case, HUD application 150 can use that display element without further modification. In some embodiments, database 142 can have multiple versions of the display element, with different amount(s) and/or type(s) of visual characteristics already applied. HUD application 150 can select a version based on one or more parameters and/or criteria, and use that version with or without further modification. HUD application 150 can include (e.g., insert) the pre-modified display element or content into the content generated in step 1004.

At step 1008, optionally HUD application 150 adjusts a virtual image distance between a projection device and a user. HUD application 150 can cause adjustments to the virtual image distance in order to reduce the offset angle between original and ghost images projected by projection unit 132. In some embodiments, HUD application 150 can adjust the virtual image distance by adjusting to the optical distance (e.g., distance D2) and/or incidence angle (e.g., incidence angle θ1 and/or θ2) between projection unit 132 and transparent object 134 (e.g., by causing adjustments to the optics in projection unit 132).

At step 1010, HUD application 150 causes the modified display content to be projected onto a transparent object. HUD application 150 projects modified images, via projection unit 132, onto transparent object 134. Transparent object 134 would redirect the projected images to the eyes of a user.

Figure 11:
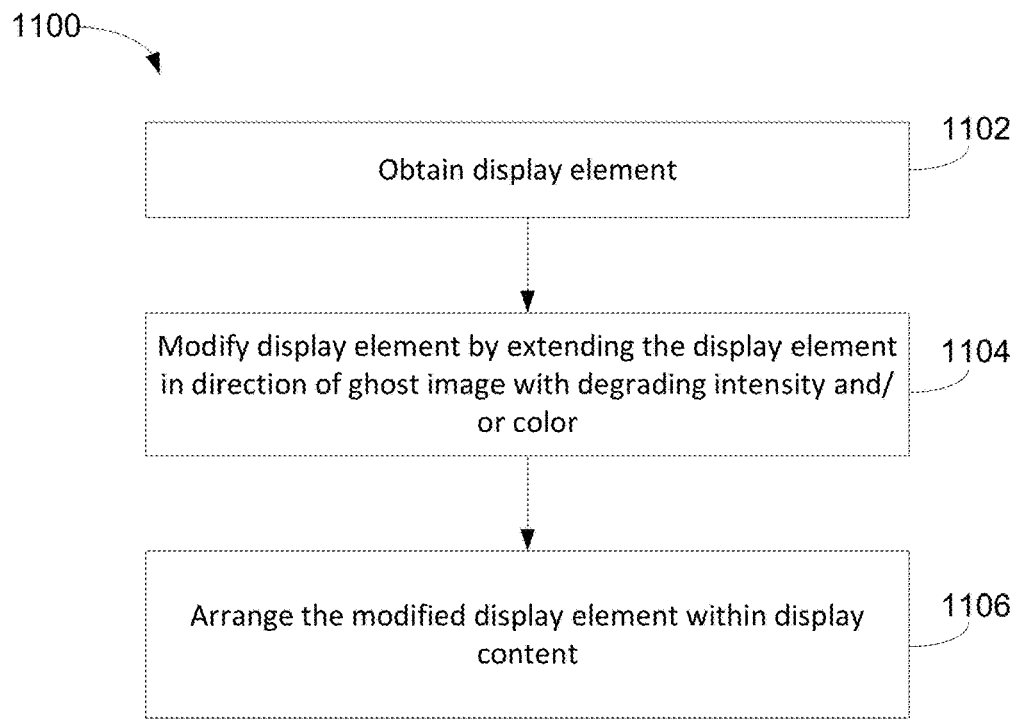
FIG. 11 is a flow diagram of method steps for applying a gradation visual characteristic to a display element, according to various embodiments.

FIG. 11 is a flow diagram of method steps for applying a gradation visual characteristic to a display element, according to various embodiments. Although the method steps are described with respect to the systems and embodiments of FIGS. 1 and 4-9D, persons skilled in the art will understand that any system configured to perform the method steps, in any order, falls within the scope of the various embodiments. In some embodiments, the steps of method 1100 can be a part of steps 1004 and/or 1006 of method 1000 above, optionally in conjunction with methods 1200, 1300, and/or 1400 below.

As shown, a method 1100 begins at step 1102, where HUD application 150 obtains a display element. HUD application 150 can retrieve a two-dimensional display element from a database 142. In some embodiments, the retrieved display element already has one or more visual characteristics applied (e.g., color changes).

At step 1104, HUD application 150 modifies the display element by extending the display element in a direction of the ghost image with degradation in at least one of intensity or color. HUD application 150 can modify the display element to apply a gradation visual characteristic to the display element. HUD application 150 can apply the gradation visual characteristic by extending or duplicating the display element in a direction of the ghost image, where the extension degrades in intensity and/or color. Additionally or alternatively, in some embodiments, HUD application 150 can select a display element from database 142 with the gradation visual characteristic already applied, and any further modifications to the display element are optional.

At step 1106, HUD application 150 arranges the modified display element within display content. HUD application 150 can arrange (e.g., insert) the modified display element within display content being generated by HUD application 150. The display content would thus include the modified display element.

Figure 12:
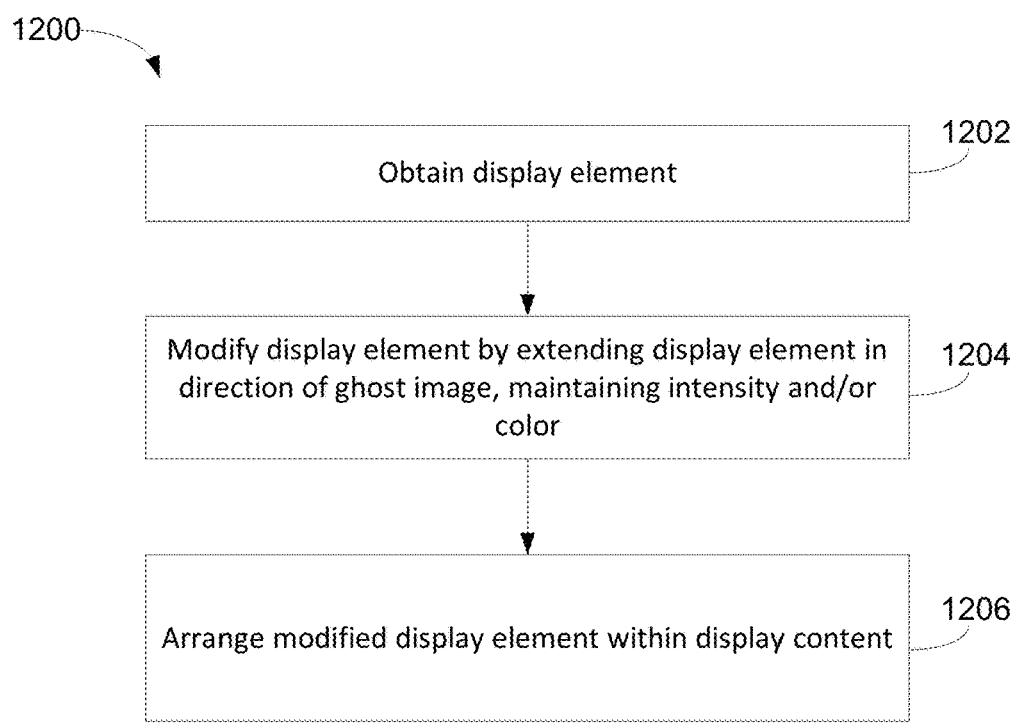
FIG. 12 is a flow diagram of method steps for applying a shape thickness visual characteristic to a display element, according to various embodiments.

FIG. 12 is a flow diagram of method steps for applying a shape thickness visual characteristic to a display element, according to various embodiments. Although the method steps are described with respect to the systems of FIGS. 1 and 4-9D, persons skilled in the art will understand that any system configured to perform the method steps, in any order, falls within the scope of the various embodiments. In some embodiments, the steps of method 1100 can be a part of steps 1004 and/or 1006 of method 1000 above, optionally in conjunction with methods 1100, 1300, and/or 1400 below.

As shown, a method 1200 begins at step 1202, where HUD application 150 obtains a display element. HUD application 150 can retrieve a two-dimensional display element from a database 142.

At step 1204, HUD application 150 modifies the display element by extending the display element in a direction of the ghost image, maintaining at least one of intensity or color in the extension. HUD application 150 can modify the display element to apply a shape thickness visual characteristic to the display element. HUD application 150 can apply the gradation visual characteristic by extending or duplicating the display element in a direction of the ghost image, where the extension maintains the intensity and/or color of the display element. Additionally or alternatively, in some embodiments, HUD application 150 can select a display element from database 142 with the shape thickness visual characteristic already applied, and any further modifications to the display element are optional.

At step 1206, HUD application 150 arranges the modified display element within display content. HUD application 150 can arrange (e.g., insert) the modified display element within display content being generated by HUD application 150. The display content would thus include the modified display element.

Figure 13:
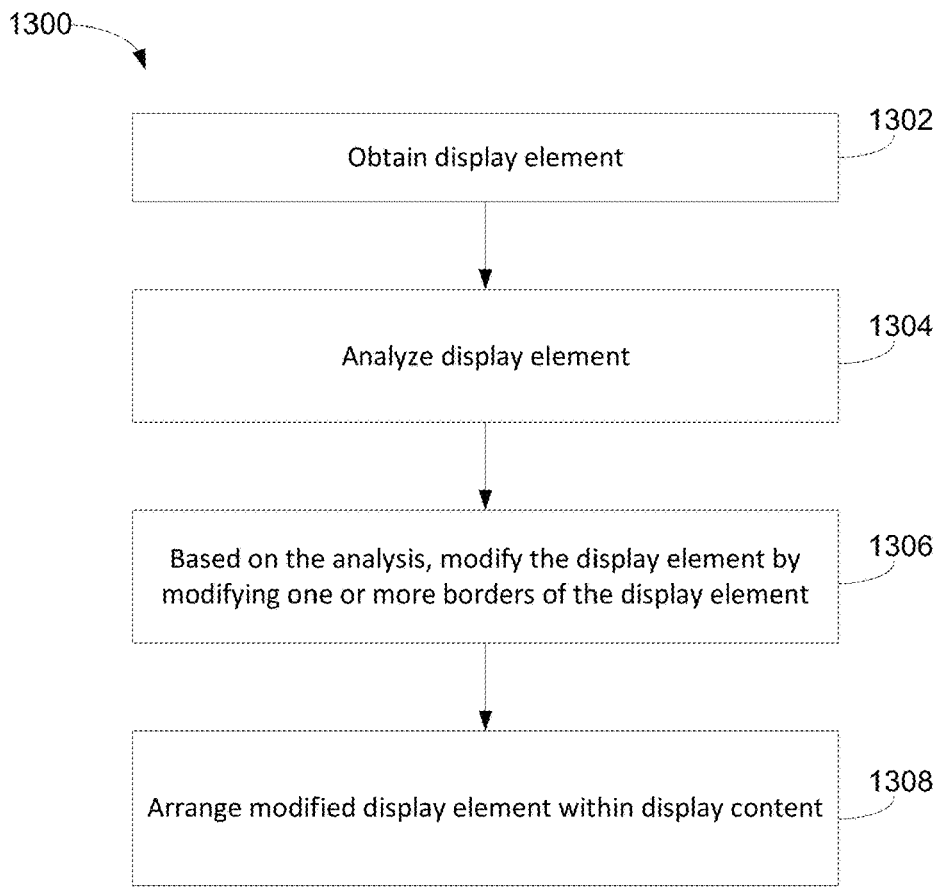
FIG. 13 is a flow diagram of method steps for modifying one or more borders of a display element, according to various embodiments.

FIG. 13 is a flow diagram of method steps for modifying one or more borders of a display element, according to various embodiments. Although the method steps are described with respect to the systems of FIGS. 1 and 4-9D, persons skilled in the art will understand that any system configured to perform the method steps, in any order, falls within the scope of the various embodiments. In some embodiments, the steps of method 1100 can be a part of steps 1004 and/or 1006 of method 1000 above, optionally in conjunction with methods 1100, 1200, and/or 1400 below.

As shown, a method 1300 begins at step 1302, where HUD application 150 obtains a display element. HUD application 150 can retrieve a two-dimensional display element from a database 142.

At step 1304, HUD application 150 can analyze the display element. HUD application 150 can, for example, analyze a color histogram of the display element to determine color and/or shade differences between portions of the display element.

At step 1306, HUD application 150, based on the analysis, modifies the display element by modifying one or more borders of the display element. HUD application 150 can, based on the color and/or shade differences between portions of the display element, modify one or more borders in the display element. The modification can include removing a border, adding a border, changing a color of a border (e.g., black to gray, gray to gray and white), changing a shade of a border (e.g., mute a color shade of the border), and/or changing an intensity (e.g., brightness) of a border. Additionally or alternatively, in some embodiments, HUD application 150 can select a display element from database 142 with the border visual characteristic already applied, and any further modifications to the display element are optional.

At step 1308, HUD application 150 arranges the modified display element within display content. HUD application 150 can arrange (e.g., insert) the modified display element within display content being generated by HUD application 150. The display content would thus include the modified display element.

Figure 14:
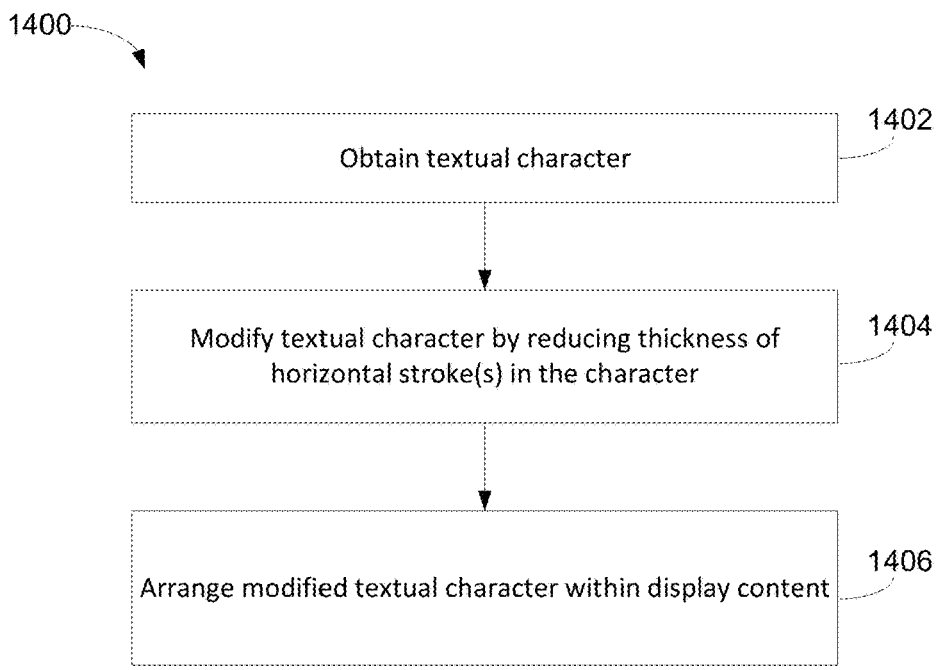
FIG. 14 is a flow diagram of method steps for modifying a stroke thickness in a textual character, according to various embodiments.

FIG. 14 is a flow diagram of method steps for modifying a stroke thickness in a textual character, according to various embodiments. Although the method steps are described with respect to the systems of FIGS. 1 and 4-9D, persons skilled in the art will understand that any system configured to perform the method steps, in any order, falls within the scope of the various embodiments. In some embodiments, the steps of method 1100 can be a part of steps 1004 and/or 1006 of method 1000 above, optionally in conjunction with methods 1100, 1200, and/or 1300 below.

As shown, a method 1400 begins at step 1402, where HUD application 150 obtains a textual character. HUD application 150 can retrieve a two-dimensional display element from a database 142, where the retrieved display element is a textual character (e.g., an alphanumeric character, an ideogramic character, a punctuation mark, a mathematical symbol). More generally, the textual character can be a character that is included in a font stored in a repository of display elements in database 142.

At step 1404, HUD application 150 modifies the textual character by reducing the stroke thickness of one or more horizontal strokes in the textual character. HUD application 150 can modify the textual character to apply a stroke thickness visual characteristic, in particular reduced horizontal stroke thickness(es), to the textual character. HUD application 150 can apply the gradation visual characteristic by identifying the horizontal strokes in the textual character and reducing the thickness of those strokes. Additionally or alternatively, in some embodiments, HUD application 150 can select a textual character from database 142 with the stroke thickness visual characteristic already applied, and any further modifications to the textual character are optional.

At step 1406, HUD application 150 arranges the modified textual character within display content. HUD application 150 can arrange (e.g., insert) the modified textual character within display content being generated by HUD application 150. The display content would thus include the modified textual character.

In sum, ghost images in a heads-up display system in a vehicle can be mitigated by changing one or more parameters associated with projection of the content by the system and/or one or more visual characteristics of the projected content. A virtual image distance between the projector system and the eye of the user can be changed to reduce the amount of separation between a desired image and a corresponding ghost image to make the ghost image less perceivable. The content to be projected by the heads-up display system can be changed to include one or more visual characteristics that mitigate the perceivability of ghost images of the content. The visual characteristics can include a gradation effect, a shape thickness effect, a line thickness effect, and/or a border effect. Text and/or shapes in the content can be manipulated to include one or more of these visual characteristics.

At least one technical advantage of the disclosed approaches relative to the prior art is that, with the disclosed techniques, the perceivability of ghost images in a heads-up display system are reduced. Accordingly, content presented by the heads-up display system can be more easily seen by a vehicle occupant. Another advantage is that the ghost images are reduced without resorting to a wedge-shaped interlayer in a transparent object used to reflect an image to a user, which reduces the manufacturing and/or implementation expense and complexity of heads-up display systems. These technical advantages provide one or more technological improvements over prior art approaches.

1. In some embodiments, a computer-implemented method comprises generating content for display on a heads-up display system; inserting into the content a version of a display element, wherein the version of the display element comprises one or more visual characteristics configured to reduce a perceivability of a ghost image of the display element; and causing the content, including the version of the display element, to be displayed by the heads-up display system.

2. The method of clause 1, wherein inserting the version of the display element comprises selecting the version of the display element from amongst a plurality of versions of the display element included in a repository of display elements.

3. The method of clauses 1 or 2, wherein inserting the version of the display element comprises modifying the display element to include the one or more visual characteristics.

4. The method of any of clauses 1-3, wherein the one or more visual characteristics comprises a gradation visual characteristic.

5. The method of any of clauses 1-4, wherein the gradation visual characteristic comprises a degrading intensity or color, and extends from the display element to a direction of the ghost image relative to an intended image of the content.

6. The method of any of clauses 1-5, wherein the one or more visual characteristics comprises a shape thickness visual characteristic, wherein the shape thickness visual characteristic increases a thickness of the display element by extending the display element to a direction of the ghost image relative to an intended image of the content.

7. The method of any of clauses 1-6, wherein the one or more visual characteristics comprises one or more border modifications.

8. The method of any of clauses 1-7, wherein the one or more border modifications comprise at least one of adding a border, removing a border, modifying an intensity of a border, modifying a color of a border, or modifying a shade of a border.

9. The method of any of clauses 1-8, wherein the display element is a textual character, and the one or more visual characteristics comprises a stroke thickness modification of a horizontal stroke of the textual character.

10. The method of any of clauses 1-9, further comprising adjusting at least one of a physical distance or an optical distance between a projection unit and an eye of a user so as to minimize an angular separation between the content and a ghost image of the content from a perspective of the user.

11. The method of any of clauses 1-10, wherein the method and the heads-up display system are implemented in a vehicle.

12. In some embodiments, one or more non-transitory computer-readable storage media include instructions that, when executed by one or more processors, cause the one or more processors to perform the steps of generating content for display on a heads-up display system; inserting into the content a version of a display element, wherein the version of the display element comprises one or more visual characteristics configured to reduce a perceivability of a ghost image of the display element; and causing the content, including the version of the display element, to be displayed by the heads-up display system.

13. The one or more non-transitory computer-readable storage media of clause 12, wherein inserting the version of the display element comprises modifying the display element to include the one or more visual characteristics.

14. The one or more non-transitory computer-readable storage media of clauses 12 or 13, wherein the one or more visual characteristics comprises a gradation visual characteristic extending from the display element to a direction of the ghost image relative to an intended mage of the content and comprising a degrading intensity or color.

15. The one or more non-transitory computer-readable storage media of any of clauses 12-14, wherein the one or more visual characteristics comprises a shape thickness visual characteristic, wherein the shape thickness visual characteristic increases a thickness of the display element by extending from the display element to a direction of the ghost image relative to an intended mage of the content.

16. The one or more non-transitory computer-readable storage media of any of clauses 12-15, wherein the one or more visual characteristics comprises one or more border modifications comprising at least one of adding a border, removing a border, modifying an intensity of a border, modifying a color of a border, or modifying a shade of a border.

17. The one or more non-transitory computer-readable storage media of any of clauses 12-16, wherein the display element is a textual character, and the one or more visual characteristics comprises a stroke thickness modification of a horizontal stroke of the textual character.

18. In some embodiments, a system comprises a transparent object; and a projection device configured to project content onto the transparent object; wherein the content comprises one or more display elements, each having one or more visual characteristics configured to reduce perceivability of a ghost image created when the content is projected onto the transparent object.

19. The system of clause 18, wherein the projection device is configured to minimize an angular separation between the projected content and the ghost image by adjusting at least one of a physical length or an optical length associated with the projection of the projected content.

20. The system of clauses 18 or 19, wherein the adjustment to the physical length or the optical length is determined based on at least an incidence angle of the projected content onto the transparent object and an incidence angle of the ghost image onto the transparent object.

Any and all combinations of any of the claim elements recited in any of the claims and/or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method, comprising:
    generating content for display on a heads-up display system;
    inserting into the content a version of a display element that includes an inner portion, a first border that surrounds the inner portion, and a second border that surrounds the first border, wherein the version of the display element comprises one or more visual characteristics configured to reduce a perceivability of a ghost image of the display element, and
    causing the content, including the version of the display element, to be displayed by the heads-up display system;
    wherein the one or more visual characteristics comprises a first modification to the second border of the version of the display element and a second modification to the inner portion of the version of the display element,
    wherein the first modification or the second modification is performed based on a size of the ghost image and an amount of separation between the ghost image and the display element.

2. The method of claim 1, wherein inserting the version of the display element further comprises modifying the display element to include the one or more visual characteristics.

3. The method of claim 1, wherein the one or more visual characteristics further comprises a gradation visual characteristic.

4. The method of claim 3, wherein the gradation visual characteristic comprises a degrading intensity or color, and extends from the display element to a direction of the ghost image relative to an intended image of the content.

5. The method of claim 1, wherein the one or more visual characteristics further comprises a shape thickness visual characteristic, wherein the shape thickness visual characteristic increases a thickness of the display element by extending the display element to a direction of the ghost image relative to an intended image of the content.

6. The method of claim 1, wherein the second modification is different than the first modification.

7. The method of claim 1, wherein the one or more visual characteristics do not include a modification to the first border.

8. The method of claim 1, wherein the inner portion of the version of the display element includes an alphanumeric character, and the first modification includes adding a border to the alphanumeric character.

9. The method of claim 1, further comprising adjusting at least one of a physical distance or an optical distance between a projection unit and an eye of a user so as to minimize an angular separation between the content and a ghost image of the content from a perspective of the user.

10. The method of claim 1, wherein the method and the heads-up display system are implemented in a vehicle.

11. One or more non-transitory computer-readable storage media including instructions that, when executed by one or more processors, cause the one or more processors to perform the steps of:
    generating content for display on a heads-up display system;
    inserting into the content a version of a display element that includes an inner portion, a first border that surrounds the inner portion, and a second border that surrounds the first border, wherein the version of the display element comprises one or more visual characteristics configured to reduce a perceivability of a ghost image of the display element, and
    causing the content, including the version of the display element, to be displayed by the heads-up display system;
    wherein the one or more visual characteristics comprises a first modification to the second border of the version of the display element and a second modification to the inner portion of the version of the display element,
    wherein the first modification or the second modification is performed based on a size of the ghost image and an amount of separation between the ghost image and the display element.

12. The one or more non-transitory computer-readable storage media of claim 11, wherein inserting the version of the display element further comprises modifying the display element to include the one or more visual characteristics.

13. The one or more non-transitory computer-readable storage media of claim 11, wherein the one or more visual characteristics further comprise a gradation visual characteristic extending from the display element to a direction of the ghost image relative to an intended mage of the content and comprising a degrading intensity or color.

14. The one or more non-transitory computer-readable storage media of claim 11, wherein the one or more visual characteristics further comprise a shape thickness visual characteristic, wherein the shape thickness visual characteristic increases a thickness of the display element by extending from the display element to a direction of the ghost image relative to an intended mage of the content.

15. The one or more non-transitory computer-readable storage media of claim 11, wherein the second modification is different than the first modification.

16. The one or more non-transitory computer-readable storage media of claim 11, wherein the inner portion of the version of the display element includes an alphanumeric character, and the first modification includes adding a border to the alphanumeric character.

17. A system comprising:

a transparent object; and a projection device configured to project content onto the transparent object;

wherein the content comprises a version of a display element that includes an inner portion, a first border that surrounds the inner portion, and a second border that surrounds the first border, wherein the version of the display element comprises one or more visual characteristics configured to reduce perceivability of a ghost image created when the content is projected onto the transparent object;

wherein the one or more visual characteristics comprises a first modification to the second border of the display element and a second modification to the inner portion of the version of the display element, wherein the first modification or the second modification is performed based on a size of the ghost image and an amount of separation between the ghost image and the display element.

18. The system of claim 17, wherein the projection device is configured to minimize an angular separation between the projected content and the ghost image by adjusting at least one of a physical length or an optical length associated with the projection of the projected content.

19. The system of claim 18, wherein the adjustment to the physical length or the optical length is determined based on at least an incidence angle of the projected content onto the transparent object and an incidence angle of the ghost image onto the transparent object.

* * * * *